United States Patent
Jones et al.

(10) Patent No.: US 12,552,979 B2
(45) Date of Patent: Feb. 17, 2026

(54) METHODS OF SERVICING A WELLBORE WITH COMPOSITIONS COMPRISING A SUSPENSION OF METAL OXIDE AND A SALT SOLUTION

(71) Applicant: Halliburton Energy Services, Inc., Houston, TX (US)

(72) Inventors: Paul J. Jones, Houston, TX (US); Samuel J. Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 31 days.

(21) Appl. No.: 18/545,641

(22) Filed: Dec. 19, 2023

(65) Prior Publication Data

US 2025/0197711 A1 Jun. 19, 2025

(51) Int. Cl.
*C09K 8/467* (2006.01)
*E21B 21/00* (2006.01)
*E21B 33/138* (2006.01)

(52) U.S. Cl.
CPC ............ *C09K 8/467* (2013.01); *E21B 21/003* (2013.01); *E21B 33/138* (2013.01)

(58) Field of Classification Search
CPC ...... C09K 8/467; E21B 21/003; E21B 33/138
See application file for complete search history.

(56) References Cited

U.S. PATENT DOCUMENTS

| | | | |
|---|---|---|---|
| 5,913,364 A | 6/1999 | Sweatman | |
| 6,167,967 B1 | 1/2001 | Sweatman | |
| 6,258,757 B1 | 7/2001 | Sweatman et al. | |
| 6,451,743 B1 | 9/2002 | Fox | |
| 6,620,769 B1 | 9/2003 | Juppe | |
| 6,668,929 B2 | 12/2003 | Griffith | |
| 6,743,756 B2 | 6/2004 | Harris, Jr. | |
| 7,350,575 B1 | 4/2008 | Lewis et al. | |
| 7,740,070 B2 | 6/2010 | Santra | |
| 7,790,774 B1 | 9/2010 | Kinsey, III | |
| 9,120,918 B2 | 9/2015 | Soddemann | |
| 10,737,978 B2 | 8/2020 | Lewis | |
| 10,982,127 B2 | 4/2021 | Sodhi | |
| 11,124,452 B2 | 9/2021 | Lewis | |

(Continued)

FOREIGN PATENT DOCUMENTS

CN 113772978 B 12/2021
EP 0104795 A2 4/1984

(Continued)

OTHER PUBLICATIONS

Filing Receipt, Specification and Drawings for U.S. Appl. No. 63/188,700, filed May 14, 22, 2021, entitled "A Wellbore Servicing Fluid and Methods of Making and Using Same," 63 pages.

(Continued)

*Primary Examiner* — Crystal J Lee
(74) *Attorney, Agent, or Firm* — Conley Rose, P.C.; Rodney B. Carroll

(57) ABSTRACT

A liquid suspension containing a metal oxide; and a glycol, a glycol ether, or a combination thereof. The liquid suspension is stable for at least about 60, 365, or 730 days under room temperature and pressure. A cementitious composition comprising the liquid suspension and methods of making and using the liquid suspension and the cementitious composition are also provided.

18 Claims, 3 Drawing Sheets

(56) References Cited

U.S. PATENT DOCUMENTS

| | | | |
|---|---|---|---|
| 11,680,199 B2 | 6/2023 | Jones et al. | |
| 11,859,123 B2 | 1/2024 | Jadhav | |
| 11,920,069 B2 | 3/2024 | Semyonov | |
| 11,932,804 B2 | 3/2024 | Jain | |
| 11,987,743 B2 | 5/2024 | Jain | |
| 2002/0193256 A1 | 12/2002 | Harris, Jr. | |
| 2003/0181532 A1 | 9/2003 | Parris | |
| 2007/0122331 A1 | 5/2007 | Amirzadeh-Asl | |
| 2008/0017376 A1 | 1/2008 | Badalamenti | |
| 2008/0169100 A1* | 7/2008 | Lewis | C09K 8/467 166/293 |
| 2008/0171673 A1 | 7/2008 | Lewis et al. | |
| 2009/0197991 A1 | 8/2009 | Bury et al. | |
| 2012/0152540 A1 | 6/2012 | Patil | |
| 2013/0274150 A1 | 10/2013 | Holt et al. | |
| 2014/0076561 A1 | 3/2014 | Reddy | |
| 2014/0090843 A1 | 4/2014 | Boul | |
| 2014/0166285 A1 | 6/2014 | Santra | |
| 2014/0318786 A1 | 10/2014 | Vidma | |
| 2014/0326452 A1 | 11/2014 | Loiseau | |
| 2015/0072902 A1 | 3/2015 | Lafitte | |
| 2016/0160109 A1 | 6/2016 | Patil | |
| 2016/0264838 A1 | 9/2016 | Nelson | |
| 2016/0264842 A1 | 9/2016 | Miller | |
| 2017/0130115 A1 | 5/2017 | Ballard | |
| 2020/0407620 A1 | 12/2020 | Wagle et al. | |
| 2021/0101833 A1 | 4/2021 | Thaemlitz et al. | |
| 2021/0355366 A1 | 11/2021 | Jadhav | |
| 2023/0019738 A1* | 1/2023 | Abdulrazzaq | C04B 28/105 |
| 2024/0018408 A1 | 1/2024 | Jain | |
| 2024/0158686 A1 | 5/2024 | Jain | |

FOREIGN PATENT DOCUMENTS

| | | | | |
|---|---|---|---|---|
| EP | 1348832 | A1 | 10/2003 | |
| EP | 3814448 | A1 | 5/2021 | |
| WO | 2007074330 | A1 | 7/2007 | |
| WO | 2007132212 | A2 | 11/2007 | |
| WO | WO-2008084193 | A2 * | 7/2008 | C09K 8/467 |
| WO | 2014167375 | A1 | 10/2014 | |
| WO | 2016154363 | A1 | 9/2016 | |
| WO | WO-2018160253 | A1 * | 9/2018 | C09K 8/502 |
| WO | 2020005736 | A1 | 1/2020 | |
| WO | 2020209831 | A1 | 10/2020 | |
| WO | 2021230954 | A1 | 11/2021 | |
| WO | 2022240458 | A1 | 11/2022 | |

OTHER PUBLICATIONS

"Foreign Communication from Related Application-International Search Report and Written Opinion of the International Searching Authority, International Application No. PCT/US2022/015171, dated May 24, 2022, 10 pages. (4727-13102)".

Office Action dated Jun. 13, 2022 (22 pages), U.S. Appl. No. 17/188,524, filed Mar. 1, 2021.

Foreign Communication from Related Application-InternationalSearch Report and Written Opinion of the International Searching Authority, International Application No. PCT/US2021/020507, dated Jun. 21, 2021, 11 pages.

Electronic Acknowledgment Receipt, Specification and Drawings for International Application No. PCT/US2021/020507, entitled "A Wellbore Servicing Fluid and Methods of Making and Using Same," filed Mar. 2, 2021, 70 pages.

Filing Receipt, Specification and Drawings for U.S. Appl. No. 63/025,702, entitled "Wellbore Servicing Fluid and Methods of Making and Using Same," filed May 15, 2020, 53 pages.

Thwala, Justice M. et al., ""Rheological Studies of Stability of Colloidal Silica Particles Dispersed in Monoethylene Glycol (MEG) Stabilized by Dodecyl Hexa Ethylene Glycol Monoether (Cl2E6),"" Langmuir, Jul. 23, 2009, vol. 25, No. 22, pp. 12926-12936, Amer••can Chemical Society.

Electronic Acknowledgment Receipt, Specification and Drawings for International Application No. PCT/US2022/15171, entitled ""A Wellbore Servicing Fluid and Methods of Making and Using Same,"" filed Feb. 4, 2022, 55 pages.

Office Action dated Jan. 21, 2022 (21 pages), U.S. Appl. No. 17/188,524, filed Mar. 1, 2021.Filing Receipt, Specification and Drawings for U.S. Appl. No. 17/188,524 entitled "Wellbore Servicing Fluid and Methods of Making and Using Same," filed Mar. 1, 2021, 84 pages.

Filing Receipt, Specification and Drawings for U.S. Appl. No. 63/188,700, entitled "Wellbore Servicing Fluid and Methods of Making and Using Same," filed May 14, 2021, 63 pages.

Foreign Communication from Related Application-International Search Report and Written Opinion of the International Searching Authority, International Application No. PCT/US2019/026362, dated Jan. 6, 2020, 11 pages.

Filing Receipt, Specification and Drawings for U.S. Appl. No. 17/188,524 entitled "Wellbore Servicing Fluid and Methods of Making and Using Same," filed Mar. 1, 2021, 84 pages.

Filing Receipt, Specification and Drawings for U.S. Appl. No. 18/953,850, filed Nov. 20, 2024, entitled "Deflocculation Additives for Wellbore Servicing Fluid Additives," 86 pages.

Foreign Communication from Related Application—International Search Report and Written Opinion of the International Searching Authority, International Application No. PCT/US2024/048294, dated Jan. 2, 2025, 10 pages.

Foreign Communication from Related Application-International Search Report and Written Opinion of the International Searching Authority, International Application No. PCT/US2024/059605, dated Aug. 12, 2025 10 pages.

* cited by examiner

METHODS OF SERVICING A WELLBORE WITH COMPOSITIONS COMPRISING A SUSPENSION OF METAL OXIDE AND A SALT SOLUTION

TECHNICAL FIELD

The present disclosure relates generally to well cementing, and more particularly to cementitious compositions comprising a Sorel type cement formed from a metal oxide liquid suspension and a salt solution, and methods of making and using same.

BACKGROUND

Natural resources such as gas, oil, and water residing in a subterranean formation or zone can be recovered by drilling a wellbore down to the subterranean formation while circulating a drilling fluid in the wellbore. After terminating the circulation of the drilling fluid, a string of pipe, e.g., casing, is run in the wellbore. A drilling fluid is then usually circulated downward through the interior of the pipe and upward through the annulus, which is located between the exterior of the pipe and the walls of the wellbore. Next, primary cementing is typically performed, whereby a cement slurry is placed in the annulus and permitted to set into a hard mass (e.g., sheath) to thereby attach the string of pipe to the walls of the wellbore and seal the annulus. The main objectives of primary cementing operations include zonal isolation to prevent migration of fluids in the annulus. Support for the casing or liner string, and protection of the casing string from corrosive formation fluids. Subsequent secondary cementing operations may also be performed. Secondary or remedial cementing operations can be performed to repair primary-cementing problems or to treat conditions arising after the wellbore has been constructed.

Oil or gas residing in the subterranean formation may be recovered by driving fluid into the well using, for example, a pressure gradient that exists between the formation and the wellbore, the force of gravity, displacement of the fluid using a pump or the force of another fluid injected into the well or an adjacent well. The production of fluid in the formation may be increased by hydraulically fracturing the formation. That is, a viscous fracturing fluid may be pumped down the casing to the formation at a rate and a pressure sufficient to form fractures that extend into the formation, providing additional pathways through which the oil or gas can flow to the well. Unfortunately, water, rather than oil or gas, may eventually be produced by the formation through the fractures therein. To provide for the production of more oil or gas, a fracturing fluid may again be pumped into the formation to form additional fractures therein. However, the previously used fractures first may need to be plugged to prevent the loss of the fracturing fluid into the formation via those fractures. In addition to the fracturing fluid, other fluids used in servicing a wellbore may also be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid can be more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation.

Lost circulation treatments involving various plugging materials such as walnut hulls, mica and cellophane have been used to prevent or lessen the loss of fluids from wellbores. The disadvantages of such treatments include the potential for damage to subterranean formations as a result of the inability to remove the plugging materials therefrom, and the dislodgement of the plugging materials from highly permeable zones whereby fluid losses subsequently resume.

One technique for preventing lost circulation problems has been to temporarily plug voids or permeable zones with Sorel cement compositions. Sorel cement compositions typically comprise magnesium oxide and a chloride or phosphate salt and water which together form, for example, magnesium oxychloride. Sorel cements can sometimes be removed with minimal damage to subterranean zones or formations by dissolution in acids.

Magnesium oxide (MgO) and magnesium chloride ($MgCl_2$) are sometimes used to produce Sorel cements for servicing wellbores. Both main components of Sorel cements (e.g., magnesium oxide (MgO) and magnesium chloride ($MgCl_2$)) are conventionally supplied as dry powders. Preparation of the cementitious mixture can involve dissolution of the salt into a solution containing set retarders, viscosifying agents and water proofing agents. The magnesium oxide is then added as a solid powder to the prepared solution, and the cementitious mixture is used for various well intervention operations.

Challenges are related the storage and condition of the MgO powder. MgO is a hygroscopic material and will react with atmospheric moisture, converting into magnesium hydroxide $Mg(OH)_2$ which is inactive at producing the set cement compound. Additionally, MgO is prone to clumping. Clumps of MgO have a tendency to sediment in the mixing, and these clumps must be broken up into particulates and dispersed throughout the system. Dispersion is an energy process that may require substantial rig time depending on the extent of material clumping.

Accordingly, a need exists for systems and methods that address the issues noted above with Sorel-type cements.

BRIEF SUMMARY OF THE DRAWINGS

For a more complete understanding of this disclosure, reference is now made to the following brief description, taken in connection with the accompanying drawings and detailed description, wherein like reference numerals represent like parts.

While embodiments of this disclosure are depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

Figure 1:
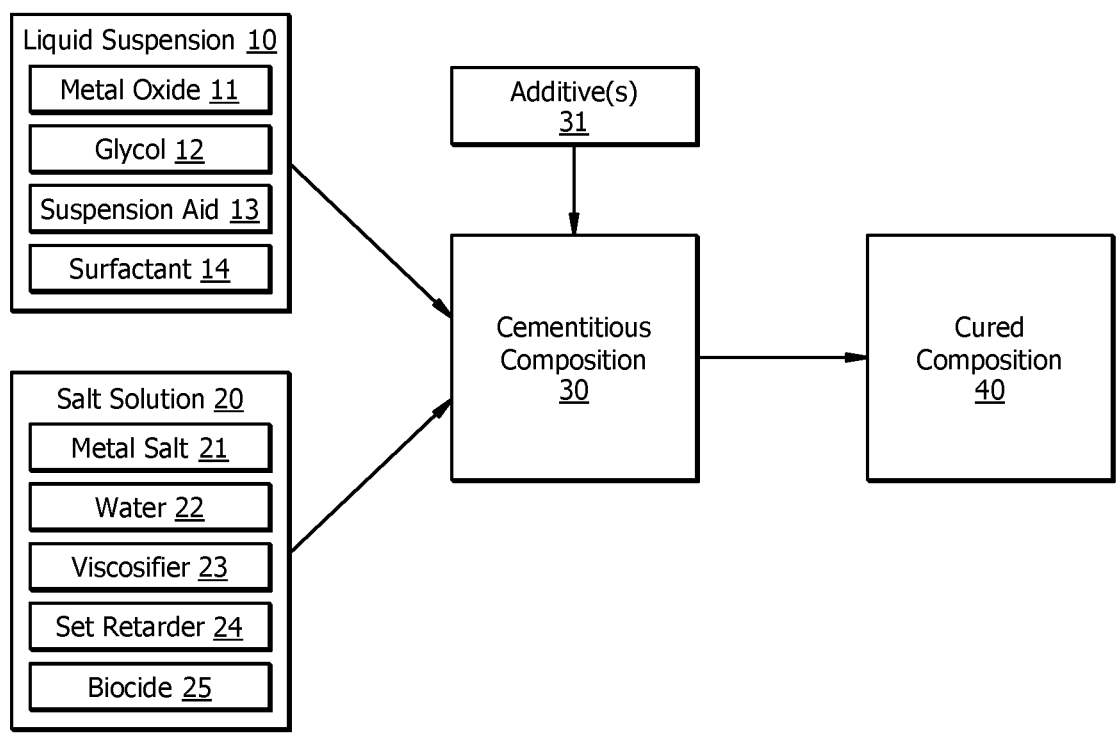
FIG. 1 is a schematic of a metal oxide liquid suspension (referred to herein simply as a "liquid suspension") and a metal salt solution (referred to herein simply as a "salt solution") that can be utilized to form a cementitious composition (also referred to herein as a wellbore servicing fluid) that can subsequently be cured to form a cured composition (also referred to herein as a "cured cement"), according to embodiments of this disclosure.

Herein disclosed is a stable, metal oxide liquid suspension (referred to herein simply as a "liquid suspension"), and methods of making the liquid suspension and using the liquid suspension as a component of a Sorel-type cementitious composition (also referred to herein simply as a cementitious or cement composition or a wellbore servicing fluid) utilized for servicing a wellbore. The liquid suspension comprises a metal oxide, a glycol, and optionally a suspension aid (e.g., silica fume), a surfactant (e.g., alcohol ethoxylate surfactant), or both a suspension aid and a surfactant. The liquid suspension is stable, as indicated by the maintenance of the metal oxide (e.g., at least a majority of, greater than 80, 90, 95, 96, 97, 98, 99% of the metal oxide) in suspension in the liquid suspension for a time period of at least about 60, 365, or 730 days under room temperature and pressure. As utilized herein, room temperature and pressure can include temperatures of from about 15° C. to about 25° C. (about 59° F. to about 77° F.), for example from about 20° C. to about 25° C. (about 68° F. to about 77° F.) or about 15, 20, or 25° C. (68° F.), and a pressure of about 101.325 kPa (1 atmosphere), for example about 100 kPa (0.986 atm). The liquid suspension is stable in that it remains in suspension for the time period, and does not react to a significant degree with atmospheric moisture, does not form immobile gel with system, and free fluid at the top of the system comprises less than 20 percent of system. The metal oxide remains substantially solid and suspended in the liquid suspension for the time period. Description of the liquid suspension will now be made with reference to FIG. 1, which is a schematic of a liquid suspension 10 and a metal salt solution (referred to herein simply as a "salt solution") 20 that can be utilized to form a cementitious composition 30 that can subsequently be cured to form a cured composition (or "cured cement") 40, according to embodiments of this disclosure. The liquid suspension 10, cementitious composition 30 comprising the liquid suspension 10, and methods can be utilized to provide efficient delivery of a cementitious mixture into a wellbore to form a barrier.

Also disclosed herein are methods of making and using a wellbore servicing fluid, more specifically, a cementitious composition 30 comprising the liquid suspension 10. In embodiments, a wellbore servicing fluid of the type disclosed herein is a cementitious fluid or cement slurry 30 that can be utilized for cementing a wellbore penetrating a subterranean formation.

Accordingly, disclosed herein are methods of preparing a stable metal oxide liquid suspension 10, methods of preparing a wellbore servicing fluid (e.g., cementitious composition 30) comprising the stable liquid suspension 10 and a salt solution 20, and methods of servicing a wellbore (e.g., cementing) by placing the wellbore servicing fluid comprising the liquid suspension 10 into a wellbore.

The liquid suspension 10 is "stable" in that the metal oxide 11 does not dissolve to a substantial degree therein, but rather is substantially uniformly suspended throughout the bulk of the glycol 12. For example, the metal oxide 11 can be substantially uniformly dispersed (e.g., floating around freely) in the liquid suspension 10. A discontinuous internal phase (e.g., solid metal oxide 11) of the liquid suspension 10 can be uniformly dispersed throughout a continuous external phase (e.g., glycol 12) of the homogenous, stable liquid suspension 10 through preparation (e.g., mixing or blending), with the use of a suspension agent 13 (e.g., a viscosifiers, such as silica fume). The liquid suspension 10 can be prepared by mixing or blending the components of the liquid suspension 10 to form the homogeneous, stable liquid suspension 10.

The metal oxide 11 can be substantially insoluble in the glycol 12. In embodiments, the metal oxide 11 can be characterized by a solubility in the glycol 12 of less than about 100 mmol/L, alternatively less than about 50 mmol/L, alternatively less than about 25 mmol/L, alternatively less than about 10 mmol/L, alternatively less than about 1 mmol/L, alternatively less than about 0.1 mmol/L, alternatively less than about 0.01 mmol/L, or 50 alternatively less than about 0.001 mmol/L. The metal oxide 11 can comprise a water-interactive material and/or a water-insoluble material. While the current disclosure is discussed in detail in the context of the liquid suspension 10 comprising a water-interactive material and/or a water-insoluble material, it should be understood that any material that is substantially insoluble in the glycol 12 and combines with salt 21 of salt solution 20 to form a Sorel-type cement can be used as the metal oxide in the liquid suspension 10.

In embodiments, the metal oxide 11 can comprise a water-interactive material. While the water-interactive material can be substantially insoluble in the glycol 12, the metal oxide 11 may react with water and/or be water soluble. For example, the water-interactive material can be substantially insoluble in the glycol 12 (e.g., characterized by a solubility in the glycol 12 of less than about 10 mmol/L) and can be soluble in water (e.g., characterized by a solubility in water of greater than or equal to about 10 mmol/L, alternatively greater than or equal to about 100 mmol/L, or alternatively greater than or equal to about 1 mol/L). As another example, the metal oxide 11 can be substantially insoluble in the glycol 12 (e.g., characterized by a solubility in the glycol 12 of less than about 10 mmol/L) and can interact with water, whereby the water-interactive material is consumed once in contact with water (e.g., by dissolution in water; by reacting with water and/or aqueous solution components).

Liquid suspension 10 as disclosed herein comprising a metal oxide 11 enables suspending of the metal oxide 11 in aqueous-compatible suspensions, when formation of water suspensions is not feasible owing to the intrinsic material properties of the metal oxide 11 with respect to water. For example, attempting to form aqueous suspensions of water-interactive materials can significantly and undesirably increase the viscosity of the aqueous suspension, thereby undesirably limiting the aqueous suspensions to relatively low concentrations of water-interactive material.

As noted hereinabove, stable, metal oxide liquid suspension 10 comprises a metal oxide 11 and a glycol 12, and can optionally further include a suspension aid 13, a surfactant 14, or a combination thereof. The liquid suspension 10 can be stable for at least about 60, 70, 80, 90, 100, 200, 300, 365, 400, 500, 600, 700, or 730 days (e.g., 0.5, 1, or 2 years) under room temperature and pressure, enabling the metal oxide to be transported to a jobsite (e.g., a wellsite) and/or combined in a liquid form with a metal salt 20 (discussed hereinbelow) with which it subsequently reacts to form the cured composition 40. The metal salt solution 20 can also be a liquid during transport to the jobsite (e.g., the wellsite) and/or when combined in a liquid form with the metal oxide liquid suspension 10 with which it subsequently reacts to form the cured composition 40.

The metal oxide 11 can be selected from inorganic oxides, alkali metal oxides, alkaline earth metal oxides, and the like, or a combination thereof. In embodiments, the metal oxide 11 comprises calcined magnesium oxide (MgO). For example, the metal oxide can comprise magnesium oxide, non-calcined magnesium oxide, calcined magnesium oxide, lightly burned magnesium oxide, hard burned magnesium oxide, dead burned magnesium oxide, zinc oxide, or a combination thereof. In embodiments, the metal oxide 11 can comprise, for example, magnesium oxide (MgO), zinc oxide (ZnO), or a combination thereof. In embodiments, the metal oxide 11 comprises inorganic oxides, alkali metal oxides, alkaline earth metal oxides, magnesium oxide, non-calcined magnesium oxide, calcined magnesium oxide, lightly burned magnesium oxide, hard burned magnesium oxide, dead burned magnesium oxide, zinc oxide, and the like, or a combination thereof. Dead burned magnesium oxide is commercially available as MICROBOND™ M and MICROBOND™ HT from Halliburton Energy Services, Inc. The metal oxide 11 can comprise a water-interactive material (e.g., a hygroscopic material) and/or a water-insoluble material. The metal oxide 11 can be substantially insoluble in the glycol(s) 12.

In embodiments, the metal oxide 11 can be present in the liquid suspension in an amount of from about 1 wt % to about 80 wt %, alternatively from about 1 wt % to about 70 wt %, alternatively from about 1 wt % to about 60 wt %, alternatively from about 1 wt % to about 50 wt %, alternatively from about 5 wt % to about 40 wt %, alternatively from about 10 wt % to about 30 wt %, alternatively from about 10 wt % to about 80 wt %, alternatively from about 20 wt % to about 70 wt %, alternatively from about 30 wt % to about 60 wt %, or alternatively from about 40 wt % to about 55 wt %, based on a total weight of the liquid suspension 10.

In embodiments, the metal oxide 11 can comprise magnesium oxide, wherein the magnesium oxide can be present in the liquid suspension 10 in an amount of from about 40 wt % to about 75 wt %, alternatively from about 40 wt % to about 74.5 wt %, alternatively from about 40 wt % to about 70 wt %, alternatively from about 40 wt. 45% to about 60 wt %, or alternatively from about 45 wt % to about 55 wt %, based on a total weight of the liquid suspension 10.

In embodiments, the metal oxide 11 can be characterized by a particle size of from about 1 nm to about 10,000 μm, alternatively from about 10 nm to about 9,000 μm, alternatively from about 10 nm to about 1,000 μm, alternatively from about 0.1 μm to about 7,500 μm, alternatively from about 0.5 μm to about 5,000 μm, alternatively from about 0.1 μm to about 1,000 μm, alternatively from about 0.1 μm to about 500 μm, alternatively from about 0.1 μm to about 250 μm, alternatively from about 1 μm to about 100 μm, alternatively from about 2 μm to about 50 μm, or alternatively from about 10 μm to about 25 μm. For purposes of this disclosure, the particle size refers to the largest dimension of any two-dimensional cross section through the particle. Nonlimiting examples of metal oxide shapes suitable for use in the present disclosure include cylindrical, discoidal, spherical, tabular, ellipsoidal, equant, irregular, cubic, acicular, angular, and the like, or a combination thereof. In embodiments, the metal oxide 11 can be characterized by a particle size of from about 0.1 μm to about 250 μm, alternatively from about 1 μm to about 100 μm, alternatively from about 2 μm to about 50 μm, or alternatively from about 10 μm to about 25 μm. In embodiments, the metal oxide 11 can be characterized by an angular and/or acicular shape. In embodiments, the metal oxide 11 can be characterized by a spherical shape. In embodiments, the metal oxide 11 can be characterized by a spherical shape, angular shape, acicular shape, or a combination thereof. For example, the metal oxide 11 can comprise any suitable combination of spherical shape particles, angular shape particles, acicular shape particles, and the like.

In embodiments, a metal oxide 11 suitable for use in the present disclosure can have a particle size in the range of from about 60 to about 1,250 mesh, alternatively from about 80 to about 625 mesh, or alternatively from about 140 to about 400 mesh, U.S. Sieve Series. In embodiments, a metal oxide suitable for use in the present disclosure may have a particle size of about 325 mesh, U.S. Sieve Series. The metal oxide 11 can be characterized by having substantially all of the particles pass through a 325 mesh screen, U.S. Sieve Series.

The metal oxide 11 can be characterized by having a majority (e.g., greater than about 50 wt %, alternatively greater than about 75 wt %, alternatively greater than about 90 wt %, alternatively greater than about 95 wt %, or alternatively greater than about 99 wt %, based on a total weight of the metal oxide 11) of the particles pass through a 325 mesh screen, U.S. Sieve Series; although some particles (e.g., less than about 50 wt %, alternatively less than about 25 wt %, alternatively less than about 10 wt %, alternatively less than about 5 wt %, or alternatively less than about 1 wt %, based on a total weight of the metal oxide 11) may not pass through the 325 mesh screen, U.S. 15 Sieve Series.

In embodiments, the metal oxide 11 can comprise magnesium oxide characterized by a particle size in the range of from about 2 μm to about 60 μm, in a range of from about 5 μm to about 45 μm, or alternatively in a range of from 20 about 10 μm to about 25 μm. In such embodiments, the metal oxide 11 can be characterized by an angular shape. The magnesium oxide may be a burnt type of magnesium oxide, such as lightly burned magnesium oxide, hard burned magnesium oxide, dead burned magnesium oxide, and the like, or a combination thereof.

As noted above, in embodiments, the liquid suspension 10 comprises a metal oxide, such as an alkaline earth metal oxide, such as magnesium oxide. In embodiments, the liquid suspension 10 comprises MgO. MgO may be prepared by calcination of Mg(OH), as depicted in Reaction 1:

$$Mg(OH)_2 + Heat \rightarrow MgO + H_2O. \quad \text{(Reaction 1)}$$

The calcination of $Mg(OH)_2$ results in what is commonly referred to as "burned MgO." Three basic grades of burned MgO are typically produced with the differences between each grade related to the degree of reactivity remaining after being exposed to a range of high temperatures. The original magnesium hydroxide particle is usually a large and loosely bonded particle. Exposure to thermal degradation by calcination causes the $Mg(OH)_2$ to alter its structure so that the surface pores are slowly filled in while the particle edges become more rounded. This results in MgO with varying degrees of crystallinity and consequently varying degrees of reactivity. When the MgO is produced by calcining to temperatures ranging between 1500° C.-2000° C., the MgO is referred to as "dead-burned" since the majority of the reactivity has been eliminated. Dead-burned MgO has the highest degree of crystallinity of the three grades of burned MgO. An example of a dead-burned MgO includes without limitation THERMATEK™ HT, which is commercially available from Halliburton Energy Services. A second type of MgO produced by calcining at temperatures ranging from 1000° C. to 1500° C. is termed "hard-burned" and displays an intermediate crystallinity and reactivity when compared to the other two grades of burned MgO. An example of a hard-burned MgO includes without limitation THERMATEK™ LT, which is commercially available from Halliburton Energy Services. The third grade of MgO is produced by calcining at temperatures ranging from 700° C. to 1000° C., and is termed "light-burned" or "caustic" magnesia. Light-burned MgO is characterized by a high surface area, a low crystallinity and a high degree of reactivity when compared to the other grades of burned MgO. In embodiments, the MgO for use in cementitious composition 30 comprises hard-burned MgO, light-burned MgO, dead-burned MgO or a combination thereof.

The liquid suspension further includes a glycol and/or glycol ether (referred to herein simply as glycol 12). Glycols suitable for use in the present disclosure can comprise an alkylene glycol, monoethylene glycol (MEG, also known as ethylene glycol), propylene glycol, butylene glycol, polyalkylene glycol, polyethylene glycol, polypropylene glycol, polybutylene glycol, and the like, or a combination thereof.

Glycol ethers suitable for use in the present disclosure can comprise methyl ethers and/or ethyl ethers of the glycols that are suitable for use as disclosed herein. For example, glycol ethers suitable for use in the present disclosure may comprise ethylene glycol monomethyl ether, ethylene glycol monoethyl ether, propylene glycol monomethyl ether, propylene glycol monoethyl ether, butylene glycol monomethyl ether, butylene glycol monoethyl ether, and the like, or a combination thereof. The glycol and/or a glycol ether (referred to herein simply as glycol 11) that are suitable for use in the liquid suspension 10 as disclosed herein may degrade within a few weeks upon contacting seawater.

The glycol 12 may be substantially water-free. However, the glycol 12 can contain trace amounts of water (e.g., from manufacturing process, atmospheric moisture, etc.). For example, the glycol 12 can contain less than about 1 wt %, alternatively less than about 0.1 wt %, alternatively less than about 0.01 wt %, alternatively less than about 0.001 wt %, or alternatively less than about 0.0001 wt % water, based on a total weight of the glycol 12. The lack of elevated water content in the glycol 12 can prevent hydration (e.g., significant hydration) of the metal oxide (e.g., magnesium oxide).

The glycol 12 is water miscible. As opposed to an oil (e.g., oleaginous fluid), the glycol 12 as disclosed herein can be water miscible, such that a compatibilizer-type material (e.g., a surfactant other than the (e.g., alcohol alkoxylate) surfactant of the liquid suspension 10) is not necessary in order to be able to homogenously mix the liquid suspension 10 with salt solution 20. Further, in applications, an oleaginous fluid may be undesirable. In embodiments, the glycol 12 comprises MEG. MEG, also referred to as mono ethylene glycol or ethylene glycol, is an organic compound characterized by the formula $(CH_2OH)_2$. Pure MEG is an odorless and colorless liquid at room temperature and is miscible in water. MEG biodegrades relatively quickly in soil (e.g., half-life of about 2-12 days), surface water (e.g., half-life of about 2-12 days), and ground water (e.g., half-life of about 4-24 days). MEG can be used as glycol 12 in the liquid suspension 10 and can degrade within a few weeks upon contacting seawater.

In embodiments, the glycol 12 can be present in the liquid suspension 10 in an amount of from about 20 wt % to about 90 wt %, alternatively, from about 20 wt % to about 89.8 wt %, alternatively from about 25 wt % to about 80 wt %, alternatively from about 25 wt % to about 70 wt %, alternatively from about 25 wt % to about 60 wt %, alternatively from about 30 wt % to about 80 wt %, alternatively from about 40 wt % to about 60 wt %, or alternatively from about 45 wt % to about 55 wt %, based on a total weight of the liquid suspension 10. In embodiments, MEG can be present in the liquid suspension 10 in an amount of from about 40 wt % to about 60 wt %, or alternatively from about 42.5 wt % to about 57.5 wt %, or alternatively from about 45 wt % to about 55 wt %, based on a total weight of the liquid suspension 10. In embodiments, the glycol 12 includes liquid mono ethylene glycol (MEG) and poly ethylene glycol (PEG). In such embodiments, the liquid suspension can comprise from about 30 to about 80, from about 40 to about 70, or from about 45 to about 55 weight percent of the mono ethylene glycol (MEG) and from about 10 to about 20, from about 10 to about 15, or from about 11 to about 14 weight percent of the poly ethylene glycol (PEG), based on the total weight of the liquid suspension 10.

As noted hereinabove, the liquid suspension 10 can further comprise a suspension aid 13. The suspension aid 13 can be a high surface area particle, with a high surface area indicated by a surface area of greater than or equal to about 50 m²/g (e.g., from about 25 to about 600 m²/g, from about 50 to about 300 m²/g, or from about 100 to about 200 m²/g). In embodiments, the suspension aid 13 functions as a viscosifier in the liquid suspension 10. Without being limited by theory, the suspension aid 13 can prevent the metal oxide 11 (e.g., magnesium oxide) from settling in the liquid suspension 10 after preparation.

By way of nonlimiting examples, in embodiments, the suspension aid 13 can be selected from fumed silica, precipitated silica, fly ash, micro sand, micronized silica, colloidal silica, graphene, or a combination thereof.

In embodiments, the suspension aid 13 comprises amorphous silica. In embodiments, the suspension aid 13 comprises amorphous silica. In embodiments, the suspension aid 13 comprises a biopolymer. Nonlimiting examples of amorphous silica suitable for use as a suspension aid 13 in the present disclosure include non-mined amorphous silica, precipitated silica, fumed silica, silica fume, porous silica, micro-sized silica, nano-sized silica, and the like, or a combination thereof. In embodiments, the suspension aid 13 comprises fumed silica.

The suspension aid 13 can be present in the liquid suspension 10 in an amount of from about greater than 0 to about 5 wt %, alternatively from about 0.01 wt % to about 10 wt %, alternatively from about 0.05 wt % to about 9 wt %, alternatively from about 0.1 wt % to about 8 wt %, alternatively from about 0.15 wt % to about 7 wt %, alternatively from about 0.25 wt % to about 5 wt %, 15 alternatively from about 0.5 wt % to about 4 wt %, alternatively from about 1 wt % to about 4 wt %, or alternatively from about 2 wt % to about 3 wt %, based on a total weight of the liquid suspension 10.

In embodiments, amorphous silica can be present in the liquid suspension 10 in an amount of from about 0.25 wt % to about 5 wt %, alternatively from about 0.5 wt % to about 4 wt %, alternatively from about 1 wt % to about 4 wt %, or alternatively from about 2 wt % to about 3 wt %, based on a total weight of the liquid suspension 10.

As noted hereinabove, the liquid suspension 10 can further comprise a surfactant 14. The surfactant 14 can comprise an anionic surfactant, an anionic surfactant, a zwitterionic surfactant, a non-ionic surfactant, or a combination thereof.

The surfactant 14 can comprise an alcohol alkoxylate surfactant. For example, the liquid suspension 10 may comprise an alcohol ethoxylate surfactant. By way of non-limiting examples, in embodiments, the surfactant 14 can comprise alcohol ethoxylate surfactant. The surfactant (e.g., alcohol alkoxylate surfactant) may help reduce or prevent gelling of the liquid suspension 10 prior to using the liquid suspension 10 (e.g., prior to adding the liquid suspension into a wellbore servicing fluid).

The alcohol alkoxylate surfactant may be characterized by the general formula $R_1(OR_2)_nOH$; wherein n (degree of ethoxylation) is from about 1 to about 30, alternatively from about 3 to about 25, or alternatively from about 3 to about 10. $R_1$ can be an alkyl group, which may be either a linear alkyl group (e.g., $R_1$ can be characterized by a degree of branching of equal to 0) or a branched alkyl group (e.g., $R_1$ can be characterized by a degree of branching of greater than 0). In embodiments where $R_1$ is a branched alkyl group, $R_1$ can be characterized by a degree of branching of greater than 0, alternatively from about 1 to about 5, or alternatively from about 1 to about 4. For example, an alkyl group having a degree of branching of 1 displays a single branching point. $R_1$ can have from about 3 to about 25 carbon atoms, alternatively from about 5 to about 20 carbon atoms, or alternatively from about 8 to about 18 carbon atoms. $R_2$ can be an alkylene group, which may be either linear or branched. In embodiments, $R_2$ can be ethylene, propylene, butylene, pentylene, or the like, or a combination thereof. $R_2$ can have from about 2 to about 5 carbon atoms, alternatively from about 2 to about 4 carbon atoms, or alternatively from about 2 to about 3 carbon atoms. In embodiments, $R_2$ can be ethylene and/or propylene.

In embodiments, the alcohol alkoxylate surfactant 14 can comprise an alcohol ethoxylate surfactant characterized by the general formula $R_1(OCH_2CH_2)_nOH$ having a degree of ethoxylation (n) of about 5, an $R_1$ carbon chain length of about 10, and a single branch point (e.g., a degree of branching of 1). A nonlimiting example of an alcohol ethoxylate surfactant includes LUTENSOL® XP50, which is a nonionic surfactant commercially available from BASF. The liquid suspension 10 can comprise a fatty alcohol ethoxylate surfactant. Examples of suitable fatty alcohol ethoxylate surfactants include lauryl alcohol ethoxylate, behenyl alcohol ethoxylate, stearyl alcohol ethoxylate, and combinations thereof.

The surfactant (e.g., alcohol alkoxylate surfactant) can be present in the liquid suspension 10 in an amount of from greater than 0 to about 5, alternatively from about 0.1 wt % to about 10 wt %, alternatively from about 0.15 wt % to about 5 wt %, alternatively from about 0.25 wt % to about 4 wt %, alternatively from about 0.4 wt. % to about 2.5 wt %, alternatively from about 1 wt % to about 4, alternatively from about 1.5 to about 3, or alternatively from about 0.5 wt % to about 1 wt %, based on a total weight of the liquid suspension 10.

In embodiments, the liquid suspension 10 comprises from about 20 to about 70, from about 30 to about 60, or from about 40 to about 50 weight percent (wt %) of the metal oxide 11 (e.g., MgO, ZnO, or a combination thereof) based on the total weight of the liquid suspension, from about 30 to about 80, from about 40 to about 70, or from about 50 to about 60 wt % glycol 12 (e.g., MEG, PEG or a combination thereof), from greater than zero to about 5, from about 1 to about 4, or from about 1.5 to about 3 weight percent of the suspension aid 13 (e.g., fumed silica) based on the total weight of the liquid suspension, and from about greater than 0 to about 5, from about 1 to about 4, or from about 1.5 to about 3 weight percent of the surfactant 14 (e.g., alcohol alkoxylate surfactant) based on the total weight of the liquid suspension. In embodiments, liquid suspension 10 comprises MgO metal oxide 11 in MEG, PEG or a mixture thereof as glycol 12. The liquid suspension 10 can additionally comprise suspension aid 13 (e.g., fumed silica) and/or surfactant(s) 14 (e.g., an alcohol ethoxylate surfactant). In embodiments, the liquid suspension 10 can comprise metal oxide 11 (e.g., magnesium oxide (MgO)), glycol 12 (e.g., MEG and/or PEG), fumed silica suspension aid 13, and an alcohol alkoxylate surfactant 14. In embodiments, the liquid suspension comprises from about 20 to 70 weight percent (wt %) MgO metal oxide 11, from about 30 to about 80 wt % MEG of glycol 12, from about 10 to about 20 wt % PEG of glycol 12, from about 0 to about 5 wt % silica fume as suspension aid 13, and from about 0 to 5 wt % alcohol ethoxylate surfactant as surfactant 14.

As discussed further hereinbelow, the liquid suspension 10 can be characterized/have one or more of the following properties: a yield point, as determined in accordance with API RP 10B-2 $2^{nd}$ Edition 2013, in a range of from about 0.25 to about 75, from about 20 to about 65, or from about 5 to about 20 lbf/100 ft$^2$; a 10-second gel strength, as determined in accordance with API RP 10B-2 $2^{nd}$ Edition 2013, in a range of from about 2 to about 80, from about 15 to about 75, or from about 5 to about 15 degrees of dial deflection using a viscometer having an R1 B1 F1 configuration; a 10-minute gel strength, as determined in accordance with API RP 10B-2 $2^{nd}$ Edition 2013, in a range of from about 2 to about 200, from about 8 to about 80, or from about 15 to about 35 degrees of dial deflection using a viscometer having an R1 B1 F1 configuration; and/or a plastic viscosity, as determined in accordance with API RP 10B-2 $2^{nd}$ Edition 2013, in a range of from about 5 to about 5000, from about 75 to about 2500, or from about 100 to about 1500 cP.

In embodiments, the liquid suspension 10 can be characterized by a plastic viscosity (e.g., initial plastic viscosity and/or aged plastic viscosity), as determined in accordance with API RP 10B-2 $2^{nd}$ Edition 2013, in a range of from about 5 to about 5000, from about 75 to about 2500, or from about 100 to about 1500 cP, from about 200 cP to about 2,500 cP, alternatively from about 300 cP to about 2,400 cP, alternatively from about 400 cP to about 2,200 cP, alternatively from about 500 cP to about 2,000 cP, or alternatively from about 600 cP to about 1,750 cP. The initial plastic viscosity and the aged plastic viscosity are measured under the same conditions at the time of preparing the composition and at a time later than the time of preparing the composition, respectively. The aged plastic viscosity may be measured after preparation at 1 day, 2 days, 3 days, 4 days, 5 days, 6 days, 7 days, 10 days, 14 days, 21 days, 28 days, etc.

The initial plastic viscosity and the aged plastic viscosity may be calculated using a Herschel-Bulkley model.

In embodiments, the liquid suspension 10 can be characterized by a yield point (e.g., initial yield point and/or aged yield point), as determined in accordance with API RP 10B-2 $2^{nd}$ Edition 2013, in a range of from about 0.25 $lb_f/100$ $ft^2$ to about 75 $lb_f/100$ $ft^2$, from about 20 $lb_f/100$ $ft^2$ to about 65 $lb_f/100$ $ft^2$, from about 5 $lb_f/100$ $ft^2$ to about 20 $lb_f/100$ $ft^2$, from about 1 $lb_f/100$ $ft^2$ to about 30 $lb_f/100$ $ft^2$, alternatively from about 2.5 $lb_f/100$ $ft^2$ to about 27.5 $lb_f/100$ $ft^2$, alternatively from about 5 $lb_f/100$ $ft^2$ to about 25 $lb_f/100$ $ft^2$, or alternatively from about 10 $lb_f/100$ $ft^2$ to about 20 $lb_f/100$ $ft^2$. The initial yield point and the aged yield point are measured under the same conditions at the time of preparing the composition and at a time later than the time of preparing the composition, respectively. The aged yield point may be measured after preparation at 1 day, 2 days, 3 days, 4 days, 5 days, 6 days, 7 days, 10 days, 14 days, 21 days, 28 days, etc. The initial yield point and the aged yield point may be calculated using a Herschel-Bulkley model.

In embodiments, the liquid suspension 10 as disclosed herein has a specific gravity of from about 1.0 to about 2.5, alternatively from about 1.2 to about 2.0, alternatively from about 1.5 to about 1.9, alternatively from about 1.55 to about 1.8, or alternatively from about 1.60 to about 1.75.

In embodiments, the liquid suspension 10 as disclosed herein has a flash point of equal to or greater than about 100° C., alternatively equal to or greater than about 110° C., or alternatively equal to or greater than about 125° C.

In embodiments, the liquid suspension 10 as disclosed herein has a melting point of less than about −10° C., alternatively less than about −15° C., or alternatively less than about −25° C. In embodiments, the liquid suspension 10 as disclosed herein has a boiling point of equal to or greater than about 190° C., alternatively equal to or greater than about 200° C., or alternatively equal to or greater than about 210° C.

In embodiments, the liquid suspension 10 stays substantially homogeneous and in a pourable fluid form during a storage period after being prepared. During the storage period, the liquid suspension 10 may display a minimal amount of free fluid, such as less than about 25 vol %, alternatively less than about 20 vol % alternatively less than 5 about 15 vol %, alternatively less than about 10 vol %, or alternatively less than about 5 vol %, based on a total volume of the liquid suspension 10. The storage period can be equal to or greater than about 1 day, alternatively greater than or equal to about 7 days, alternatively greater than or equal to about 14 days, alternatively greater than or equal to about 21 days, or alternatively greater than or equal to about 28 days.

To be more effective in certain applications, such as lost circulation control described hereinbelow, the liquid suspension 10 (and/or cement composition 30 comprising same) can be thixotropic, maintaining a low viscosity while under shear, but, when allowed to remain static, the wellbore servicing fluid can develop gel strength quickly with the ability to thin and flow when shear is re-applied. Rapid development of compressive strength can also be desired after placement, for example into a lost circulation zone.

Being thixotropic means having a property of thixotropy, which is a time-dependent shear thinning property. When a stress is applied (being shaken, agitated, sheared, pumped, or otherwise stressed) to a thixotropic fluid (e.g., the thixotropic cement composition), viscosity of the thixotropic fluid decreases and the thixotropic fluid becomes thin and less viscous over time; after the stress stops, viscosity of the thixotropic fluid increases and it will take a finite time for the thixotropic fluid to return to a viscous state. In embodiments, a thixotropic cement composition 30 is effectively thixotropic to be pumped downhole, and upon cessation of the pumping the thixotropic cement composition 30 exhibits increasing gel strength to set.

In embodiments, a liquid suspension 10 of the type disclosed herein can be prepared using any suitable method. For example, a method of the present disclosure can comprise contacting components of the liquid suspension 10 (e.g., a metal oxide 11, such as MgO); glycol 12, such as MEG; a suspension aid 13, such as amorphous silica (e.g., fumed silica), and an (e.g., alcohol alkoxylate) surfactant 14, such as an alcohol ethoxylate surfactant, to form the liquid suspension 10. The contacting can comprise placing the components into a suitable liquid suspension container (e.g., a mixer, a blender, a sonicator, a bid mill, a homogenizer) to form a suspension mixture, and blending the suspension mixture until the suspension mixture becomes a pumpable fluid (e.g., a liquid suspension 10). The liquid suspension container can be any container that is compatible with the liquid suspension 10 and has sufficient space for the liquid suspension 10. A blender can be used for blending.

In embodiments, a method of making the liquid suspension 10 as disclosed herein may comprise (a) contacting metal oxide 11, glycol 12, suspension aid 13, and an alcohol alkoxylate surfactant 14 to form a suspension mixture; and (b) agitating (e.g., shearing, stirring, shaking, blending, mixing, gas bubbling, pumping, or the like, or a combination thereof) the suspension mixture to form the liquid suspension 10.

In embodiments, a liquid suspension 10 of the type disclosed herein can be prepared by contacting suspension aid 13, such as amorphous silica (e.g., fumed silica), and glycol 12. The contacting can comprise placing the components into a suitable liquid suspension container (e.g., a mixer, a blender, a sonicator, a bid mill, a homogenizer) to form a base mixture. In embodiments, the amorphous silica suspension aid 13 may be added to the glycol 12, for example under agitation (e.g., shear), in order to form the base mixture. In other embodiments, the glycol 12 can be added to the amorphous silica suspension aid 13, for example under agitation, in order to form the base mixture. In yet other embodiments, the amorphous silica suspension aid 13 and glycol 12 can be added simultaneously to a mixing container, for example under agitation, in order to form the base mixture. The base mixture can then be contacted with the metal oxide 11 to be dispersed which is then mixed, as described herein, to form a uniform suspension comprising the metal oxide 11. In embodiments a viscosifier may be contacted with and incorporated into the uniform suspension, for example under agitation. The uniform suspension may be contacted with the alcohol alkoxylate surfactant 14, such as an alcohol ethoxylate surfactant, to form liquid suspension 10.

In embodiments, a liquid suspension 10 of the type disclosed herein can be prepared by contacting amorphous silica (e.g., fumed silica) and glycol 12 (e.g., MEG) to form a base mixture. The contacting can comprise (i) placing glycol 12 into a suitable liquid suspension container (e.g., a mixer, a blender, a sonicator, a bead mill, a homogenizer) and applying shear to the glycol 12; (ii) mixing (e.g., blending, adding) the amorphous silica (e.g., fumed silica) into the glycol 12 to form a base mixture; (iii) mixing the metal oxide 11 (e.g., MgO) into the base mixture to form a uniform suspension; (iv) adding the surfactant 14 (e.g., alcohol alkoxylate surfactant, such as an alcohol ethoxylate surfactant), to the uniform suspension to form liquid suspension 10.

In embodiments, the order of combination of metal oxide 11, glycol 12, suspension aid 13, and surfactant 14 (e.g., alcohol alkoxylate surfactant) can be adjusted as necessary or desired.

As noted above, the liquid suspension 10 as disclosed herein can be used to form a cementitious composition 30, which can be utilized as a wellbore servicing fluid. In embodiments, the liquid suspension 10 can be prepared at the wellsite. Components of the liquid suspension 10 can be transported to the wellsite and combined (e.g., mixed/blended) proximate the wellsite to form the liquid suspension 10. The components of the liquid suspension 10 can be pre-combined such that the liquid suspension 10 is prepared at a location remote from the wellsite and transported to the wellsite, and, if necessary, stored at an on-site location for use in making cementitious composition 30. When it is desirable to prepare the liquid suspension 10 at the wellsite, the components of the liquid suspension 10 can be added into a liquid suspension container (e.g., a blender tub, for example mounted on a trailer), and the suspension mixture can then be blended until the suspension mixture becomes a pumpable fluid (e.g., a liquid suspension 10). In embodiments, the liquid suspension 10 is prepared at a location remote from the wellsite, transported to the wellsite, optionally stored at the wellsite and combined with salt solution 20, and optionally other components, such as optionally one or more additives (e.g., supplemental additives), such as weighting agents, or weight-reducing agents to form a cementitious composition 30 wellbore servicing fluid. Transporting of the liquid suspension 10 and/or the components of the liquid suspension 10 can be done by a ship, a pipeline, tanker truck, or any suitable transportation method.

In embodiments, the liquid suspension 10 can be present in cementitious composition 30 in an amount ranging from about 0.1 wt % to about 60 wt %, alternatively from about 0.1 wt % to about 40 wt %, alternatively from about 0.1 wt % to about 20 wt %, alternatively from about 0.5 wt % to about 10 wt %, or alternatively from about 1 wt % to about 5 wt %, based on the total weight of the cementitious composition 30.

Cementitious composition 30 comprises a Sorel type cement. In various embodiments, Sorel cements comprise a metal oxide, such as magnesium oxide and a soluble salt, such as a chloride, sulfate, or phosphate salt. Magnesium oxychloride (conventional Sorel cement) can be made by mixing powdered magnesium oxide (magnesia) with a concentrated solution of magnesium chloride. The principal phases formed can be $Mg_3(OH)_5Cl\cdot 4H_2O$ and $Mg_2(OH)_3Cl\cdot 4H_2O$. With atmospheric $CO_2$ attack, two other phases can be formed $Mg_2OHClCO_3\cdot HO$ and $Mg_5(OH)_2(CO_3)_4\cdot 4H_2O$. Combination of liquid suspension 10 (e.g., comprising MgO) with the salt solution 20 (e.g., comprising $MgCl_2$) leads to formation of a gel (setting). Sorel cements can have, for a given porosity, better mechanical strengths than ordinary Portland cements.

Effective chemical reaction can be affected by the quality of the magnesia, which can be produced via consistent, adequate burning. Under-burning can produce an excessively reactive product and over-burning an insufficiently reactive material. The hydration reactions are complex.

Other Sorel-type cements can be formed via the liquid suspension 10 and salt solution 20, and such are intended to be within the scope of this disclosure. For example, one product consists of Sorel cement with up to 10 percent of a water-soluble ammonium salt, such as ammonium chloride and sometimes also similar quantities of an aminoplast. These additives can be included to give the Sorel cement better resistance against magnesium sulfate present in the inflow of water or brine to be sealed and also better setting priorities. Another Sorel cement product consists of a stoichiometric mixture of magnesium and calcium oxides, carbonates and sulfates, which is hydrated in chloride-containing waters. This particular cement mix can be described as reacting by polymerization to form a magnesium hydroxy sulfate/chloride polyhydrate of high compressive strength. A water resisting Sorel cement can be obtained by including a suitable additive containing $H_3PO_3$ to the $MgO$—$MgCl_2$—$H_2O$-fly ash system. This allowed the formation of a stable phase $5\ Mg(OH)_2\cdot MgCl_2\cdot 8HO$, together with the insoluble phase $Mg_2P_2O_7$, in the hardened magnesium oxychloride matrix.

Magnesium oxysulfate cements can be produced by adding magnesium chloride solutions to calcium sulfates or calcium phosphate-sulphate mixtures. The magnesium oxysulfate cements formed can be regarded as variants of Sorel cements. The phosphates, where present, can improve the rheological properties of the cement pastes and their water resistance. Alternatively, magnesium oxide can be treated with sulfuric acid to form magnesium oxysulfate cements.

The above-noted and other Sorel-type cementitious compositions can be produced as described herein via a metal oxide liquid suspension 10 and metal salt solution 20 and placed into a wellbore and allowed to set and form a rigid mass having an appreciable compressive strength.

Cementitious composition 30 comprises the liquid suspension 10 in combination with the salt solution 20. The cementitious composition 30 can comprise the liquid suspension 10 and the salt solution 20 in a weight ratio of about 4, 3, 2, or 1 to about 1, 2, 3, or 4 (e.g., a ratio of greater than less than, or equal to about 4:1, 3:1, 2:1, 1:1, 1:2, 1:3, or 1:4), or any range thereamong. The weight ratio of metal oxide 11 to metal salt 21 utilized in cementitious composition 30 can be a ratio of from about 1:4 metal oxide 11:metal salt 21 to about 4:1 metal oxide 11:metal salt 21, or, alternatively, from about 4:1 to about 1:1 metal oxide 11:metal salt 21, or from about 1:4 to about 4:1 metal oxide 11:metal salt 21.

Salt solution 20 comprises a metal salt 21 and water 22. The metal salt 21 can comprise a soluble salt. The metal salt 21 can comprise a chloride salt, a phosphate salt, a sulfate salt, a carbonate salt, an ammonium salt, or a combination thereof. In embodiments, the metal salt 21 comprises an alkaline earth metal chloride, such as magnesium chloride ($MgCl_2$), alternatively magnesium chloride hexahydrate, $MgCl_2\cdot 6H_2O$. A suitable $MgCl_2\cdot 6H_2O$ for use in this disclosure is C-TEK commercially available from Halliburton Energy Services. In embodiments, the metal salt 21 comprises a metal chloride, a metal sulfate, or a combination thereof. For example, in embodiments, the metal salt 21 can comprise magnesium chloride ($MgCl_2$), zinc chloride ($ZnCl_2$), magnesium sulfate ($MgSO_4$), zinc sulfate ($ZnSO_4$; $ZnSO_4\ (H_2O_x)$), or a combination thereof. The metal of the metal salt of salt solution 20 can be a same or different metal as a metal of the metal oxide. That is, the metal oxide 11 and the metal salt 21 of cementitious composition 30 can comprise a same metal or a different metal. For example, in embodiments, the metal oxide 11 comprises magnesium oxide and the metal salt 21 of the metal salt solution 20 comprises magnesium chloride, magnesium sulfate, or a combination thereof. By way of further example, in embodiments, the metal oxide 11 comprises zinc oxide and the metal salt 21 of the metal salt solution 20 comprises zinc chloride, zinc sulfate, or a combination thereof.

In embodiments, the Sorel cement is formed via contacting the metal oxide (e.g., MgO) liquid suspension 10 with a phosphate salt, optionally in the presence of other components to be described in more detail herein. In such embodiments, the salt solution 20 can comprise a phosphate salt 21 such as for example potassium phosphate, sodium phosphate, ammonium phosphate or a combination thereof. In embodiment, metal salt 21 can comprise magnesium chloride, magnesium sulfate, sodium phosphate, potassium phosphate, ammonium phosphate, zinc chloride, zinc sulfate, or a combination thereof.

The salt solution 20 can comprise from about 25 to about 75, from about 35 to about 70, or from about 50 to about 60 of the metal salt, from about 25 to about 75, from about 30 to about 60, or from about 40 to about 50 of the water, or from about 5 to about 30, from about 10 to about 25, or from about 15 to about 20 of the metal salt and from about 20 to about 90, from about 30 to about 80, or from about 40 to about 60 of the water, based on a total weight of the salt solution.

In embodiments, the water 22 can be present in the cementitious composition 30 in an amount of from about 10 L/100 kg to about 400 L/100 kg, alternatively from about 20 L/100 kg to about 150 L/100 kg, or alternatively from about 30 L/100 kg to about 65 L/100 kg, based on a total weight of the cementitious composition 30.

The wellbore servicing fluid (e.g., cementitious fluid 30) can thus comprise water 22. The water 22 can be selected from a group including freshwater, seawater, saltwater, brine (e.g., underground natural brine, formulated brine, etc.), or combinations thereof. Generally, the water 22 can be from any source, provided that it does not contain an amount of components that may undesirably affect the other components in the cementitious composition 30. The water can be present in the cementitious composition 30 in an amount effective to provide a slurry having desired (e.g., job or service specific) rheological properties.

In embodiments, the cementitious composition 30 comprises (e.g., the salt solution 20 further comprises) a viscosifier 23, a set retarder 24, a biocide 24, or a combination thereof. In embodiments, the cementitious composition (e.g., the salt solution 20) comprises the viscosifier 23. In embodiments, the salt solution 20 comprises from greater than 0 to about 0.2, from about 0.01 to about 0.15 or from about 0.05 to about 0.1 weight percent of the viscosifier 23, based on a total weight of the salt solution 20. In embodiments, viscosifier 23 (e.g., diutan) can be present in the salt solution 20 in an amount of from about 0 wt % to about 0.1 wt %, alternatively from about 0.001 wt % to about 0.075 wt %, or alternatively from about 0.01 wt % to about 0.05 wt %, based on a total weight of the salt solution 20. The viscosifier 23 can be selected from biopolymer gum, guar gum, xanthan gum, welan gum, diutan, cellulose, hydroxyethyl cellulose (HEC), modified cellulose, diatomaceous earth, starch, modified/crosslinked starch, viscoelastic surfactants (VES), derivatives thereof, and the like, or a combination thereof.

In embodiments, the cementitious composition 30 comprises (e.g., the salt solution 20 further comprises) the set retarder or "inhibitor" 24. In embodiments, the salt solution 20 comprises from about greater than 0 to about 2, from about 1 to about 2, or from about 0.5 to about 0.9 weight percent of the set retarder 24, based on a total weight of the salt solution 20.

Set retarder 24 can be used to adjust the time required for setting of the slurry. Such set retarders 24 may allow the operator to control the set time of the composition based on the geothermal temperature at which the composition 30 will be used. Increasing the weight percentage of the set retarder 24 can increase the time required for the composition to undergo the phase transition from a slurry to a set mass with appreciable compressive strength. Inhibitors/set retarders 24 suitable for use in this disclosure include without limitation sodium hexametaphosphate (technical grade granular), potassium magnesium phosphate hexahydrate, potassium magnesium hexametaphosphate or combinations thereof. An example of a set retarder 24 suitable for use in this disclosure is sodium hexametaphosphate commercially available from Deepearth Solutions under the trademark R-TEK.

In embodiments, the thickening time of the cementitious composition 20 can be adjusted through the use of a set retarder 24 (e.g., sodium hexametaphosphate), such that the composition 30 remains pumpable during downhole placement before rapidly setting. The thickening time refers to the time required for the cement composition to achieve 70 Bearden units of Consistency (Bc). At about 70 Bc, the slurry can undergo a conversion from a pumpable fluid state to a non-pumpable paste. Set retarders 24 can be present in the cementitious composition 30 in a range of from about 0.01% to about 10.0% by weight of the metal oxide 11 (e.g., magnesium oxide), alternatively from about 0.1% to about 8%, alternatively from about 0.1% to about 6%.

In embodiments, the cementitious composition 30 comprises (e.g., the salt solution 20 further comprises) the biocide 25. In embodiments, the salt solution comprises from about greater than 0 to about 0.1, from about 0.01 to about 0.09, or from about 0.05 to about 0.075 weight percent of the biocide, based on a total weight of the salt solution 20.

A wellbore servicing fluid (e.g., cementitious fluid 30) of the type disclosed herein can exclude a biocide 25. In embodiments, a cementitious composition 30 of the type disclosed comprises equal to or less than about 1%, 0.1%, 0.001%, 0.0001%, 0.00001%, 0.000001%, or 0.0000001% biocide (e.g., from zero or greater than zero to 1%, 0.1%, 0.001%, 0.0001%, 0.00001%, 0.000001%, or 0.0000001% biocide), based on the total weight of the cementitious composition 30.

In embodiments, the salt solution 20 comprises from about 25 to about 75, from about 35 to about 70, or from about 50 to about 60 weight percent (wt %) metal salt 21 (e.g., $MgCl_2$, $ZnCl_2$, $MgSO_4$, $ZnSO_4$, or a combination thereof), from about 30 to about 60, or from about 40 to about 50 of the water 22, from about 0 to about 0.1, from about 0 to about 0.05, or from about 0 to about 0.07 wt % viscosifier 23, from about 0 to about 1, from about 0 to about 1.5, or from about 0 to about 2 wt % set retarder 24, and from about 0 to about 7, from about 0 to about 6, or from about 0 to about 5 wt % biocide 25, based on a total weight of the salt solution.

In embodiments, salt solution 20 comprises $MgCl_2$ metal salt 21 in water 22. In embodiments, salt solution 20 comprises $MgSO_4$ metal salt 21 in water 22. In embodiments, salt solution 20 comprises $ZnCl_2$ metal salt 21 in water 22. In embodiments, salt solution 20 comprises $ZnSO_4$ metal salt 21 in water 22. The salt solution 20 can additionally comprise viscosifier 23, set retarder 24, and/or biocide 25. In embodiments, the salt solution 20 from about 20 to 70, from 40 to about 80 wt % metal salt ($MgCl_2$), from about 20 to about 60 wt % water, from about 0 to about 0.1 wt % viscosifier, form about 0 to about 2 wt % set retarder 24, and from about 0 to about 0.1 wt % biocide.

In embodiments, additives 31 may be included in the cementitious composition 30 for improving or changing the properties thereof. Examples of such additives 31 include, but are not limited to, salts, accelerants, viscosifiers, fluid loss agents, weighting materials, dispersants, vitrified shale, formation conditioning agents, or combinations thereof. Other mechanical property modifying additives, for example, carbon fibers, glass fibers, metal fibers, minerals fibers, and the like can be added to further modify the mechanical properties. These additives can be included singularly or in combination. Additives 31 can be added separately, via the liquid suspension 10, the salt solution 20, or a combination thereof.

In embodiments, the wellbore servicing fluid (e.g., cementitious composition 30) thus further comprises one or more additives 31 (e.g., supplemental additives). The one or more supplemental additives may comprise a defoamer, a cement retarder, a cement dispersant, a fluid loss control additive, a fume silica, a free fluid control additive, a viscosifying agent, an acid, a base, an emulsifier, a salt, a corrosion inhibitor, a mutual solvent, a conventional breaking agent, a relative permeability modifier, lime, a gelling agent, a crosslinker, a flocculant, a water softener, a proppant, an oxidation inhibitor, a thinner, a scavenger, a gas scavenger, a lubricant, a friction reducer, a bridging agent, a vitrified shale, a thixotropic agent, a surfactant, a scale inhibitor, a clay, a clay control agent, a clay stabilizer, a silicate-control agent, a biostatic agent, a storage stabilizer, a filtration control additive, a foaming agent, a foam stabilizer, latex emulsions, a formation conditioning agent, elastomers, gas/fluid absorbing materials, a lost circulation material, resins, superabsorbers, mechanical property modifying additives, inert particulates, or the like, or a combination thereof.

The cementitious composition 30 can have one or more of the following properties: a viscometer reading at 3 RPM, as determined in accordance with API RP 10B-2 $2^{nd}$ Edition 2013, of from about 1 to about 50, from about 5 to about 10, or from about 10 to about 25 degrees of dial deflection using a viscometer having an R1 B1 F1 configuration; a viscometer reading at 6 RPM, as determined in accordance with API RP 10B-2 $2^{nd}$ Edition 2013, of from about 2 to about 75, from about 5 to about 10, or from about 10 to about 30 degrees of dial deflection using a viscometer having an R1 B1 F1 configuration; a viscometer reading at 100 RPM, as determined in accordance with API RP 10B-2 $2^{nd}$ Edition 2013, of from about 10 to about 300, from about 20 to about 200, or from about 50 to about 65 degrees of dial deflection using a viscometer having an R1 B1 F1 configuration; a viscometer reading at 300 RPM, as determined in accordance with API RP 10B-2 $2^{nd}$ Edition 2013, of from about 20 to about 300, from about 50 to about 250, or from about 125 to about 175 degrees of dial deflection using a viscometer having an R1 B1 F1 configuration; or a combination thereof.

The wellbore servicing fluid (e.g., cementitious composition 30) can be operable for use/utilized in a wellbore having a Bottomhole Circulating Temperature (BHCT) from about 70° F. to about 400° F., alternatively from about 120° F. to about 400° F., or alter natively from about 160° F. to about 370° F. In embodiments, the wellbore servicing fluid is used in a wellbore having a Bottomhole Static Temperature (BHST) from about 100° F. to about 400° F., alternatively from about 150° F. to about 400° F., or alternatively from about 190° F. to about 400° F.

Cementitious composition 30 can be utilized to permanently seal an annular space between a casing and a wellbore wall. A cementitious composition 30 can alternatively or additionally be used to seal formations to prevent loss of drilling fluid (e.g., in squeeze cementing operations) or for operations ranging from setting kick-off plugs to plug and abandonment of a wellbore. Generally, a cementitious composition 30 used in oil field is less viscous and has less strength than cement or concrete used for construction, since the cementitious composition 30 is required to be pumpable in a relatively narrow annulus over long distances.

Also provided herein is a method of forming a cementitious composition 30. A cementitious composition 30 of the type disclosed herein can be prepared using any suitable method. The cementitious composition 30 can be formed by: providing metal oxide liquid suspension 10, as described hereinabove, and contacting the liquid suspension 10 with a salt solution 20 of this disclosure to form the cementitious composition 30. Accordingly, the cementitious composition 30 can be formed by: combining metal oxide 11, glycol 12, optionally a suspension aid 13, and optionally a surfactant 14 to provide (e.g., stable metal oxide) liquid suspension 10; and contacting (e.g., combining with, mixing, or otherwise contacting-above ground or downhole) the liquid suspension 10 with salt solution 20 to form the cementitious composition 30.

The cementitious composition 30 can be a chemical or "nonhydraulic" cement, such as a Sorel cement, as described hereinabove. For example, cementitious composition 30 can be a Sorel cement produced with a magnesium oxide metal oxide 11 liquid suspension 10 and a magnesium chloride metal salt solution 20. In such embodiments, combination of the metal oxide suspension 10 with metal salt solution 20 can produce a cementitious composition 30 comprising magnesium oxychloride. In alternative embodiments, the metal oxide 11 can comprise zinc oxide, the metal salt solution 12 can comprise zinc chloride, and combination of the zinc oxide liquid suspension 10 with the zinc chloride salt solution 20 can result in the formation of a zinc oxychloride Sorel-type cement composition 30. In alternative embodiments, the metal oxide 11 can comprise magnesium oxide, the metal salt solution 12 can comprise magnesium sulfate, and combination of the MgO liquid suspension 10 with the $Mg_2SO_4$ salt solution 20 can result in the formation of a magnesium oxysulfate cement composition 30. In alternative embodiments, the metal oxide 11 can comprise zinc oxide, the metal salt solution 12 can comprise zinc sulfate, and combination of the zinc oxide liquid suspension 10 with the zinc sulfate salt solution 20 can result in the formation of a zinc oxysulfate cement composition 30. Other Sorel-type cements are within the scope of this disclosure.

As noted above, the cementitious composition 30 can further include a viscosifier 23, a set retarder 24, a biocide 25, or a combination thereof, in which case, the method of making the cementitious composition 30 can further include combining metal salt 21, water 22, and optionally a viscosifier 23, a set retarder 24, a biocide 25, or a combination thereof, to form the salt solution 20, prior to combining the salt solution 20 with the metal oxide suspension 10 to form the cementitious composition 30. Alternatively or additionally, viscosifier 23, set retarder 24, biocide 25, or a combination thereof can be added/incorporated into metal oxide liquid suspension 10 and/or added separately to cementitious composition 30.

Contacting the liquid suspension 10 with the salt solution 20 to form the cementitious composition 30 can comprise combining the liquid suspension 10 with the salt solution 20 in a weight ratio of about 4, 3, 2, or 1 to about 1, 2, 3, or 4 or any ratio thereamong (e.g., a ratio of greater than less than, or equal to about 4:1, 3:1, 2:1, 1:1, 1:2, 1:3, or 1:4).

In embodiments, contacting the liquid suspension 10 with the salt solution 20 to form the cementitious composition 30 can be effected by pumping the metal oxide liquid suspension 10 downhole in a formation and/or wellbore comprising the salt solution 20, whereby the liquid suspension 10 contacts water and/or the salt solution 20. For example, a metal oxide liquid suspension 10 can be pumped downhole (singularly, without combining with a salt solution 20 prior to introducing the liquid suspension downhole downhole) and react with connate water (e.g., in the well 322 or formation 320 or loss circulation zone 322' thereof) to form the Sorel cement (e.g., $Mg(OH)_2$).

In embodiments, combining the metal oxide 11, the glycol 12, the optional suspension aid 13, and the optional surfactant 14 to provide the stable metal oxide liquid suspension 10 can be effected at a different jobsite (e.g., wellsite) than a jobsite at which contacting the liquid suspension 10 with the salt solution 20 to form the cementitious composition 30 is effected.

Contacting the liquid suspension 10 with the salt solution 20 to form the cementitious composition 30 can provide a pumpable mixture (e.g., having a desirable rheology as noted hereinabove. For example, in embodiments, contacting the liquid suspension 10 with the salt solution 20 can provide a cementitious composition 30 that, for example, includes a viscometer reading at 3 RPM, as determined in accordance with API RP 10B-2 $2^{nd}$ Edition 2013, of from about 1 to about 50, from about 5 to about 10, or from about 10 to about 25 degrees of dial deflection using a viscometer having an R1 B1 F1 configuration; a viscometer reading at 6 RPM, as determined in accordance with API RP 10B-2 $2^{nd}$ Edition 2013, of from about 2 to about 75, from about 5 to about 10, or from about 10 to about 30 degrees of dial deflection using a viscometer having an R1 B1 F1 configuration; a viscometer reading at 100 RPM, as determined in accordance with API RP 10B-2 $2^{nd}$ Edition 2013, of from about 10 to about 300, from about 20 to about 200, or from about 50 to about 65 degrees of dial deflection using a viscometer having an R1 B1 F1 configuration; a viscometer reading at 300 RPM, as determined in accordance with API RP 10B-2 $2^{nd}$ Edition 2013, of from about 20 to about 300, from about 50 to about 250, or from about 125 to about 175 degrees of dial deflection using a viscometer having an R1 B1 F1 configuration; or a combination thereof.

After contacting the liquid suspension 10 with the salt solution 20 to form the cementitious composition 30, the cementitious composition 30 can cure to form a gel strength that is in a range of from about 15,000 $lb/ft^2$ to about 25,000 $lb/ft^2$, from about 150,000 $lb/ft^2$ to about 20,000 $lb/ft^2$, or from about 15,000 to about 18,000 $lb/ft^2$, or greater than or equal to about 15,000, 20,000, 25,000 $lb/ft^2$, or more. After formation, the liquid suspension 20 can be stable for at least about 60, 365, or 730 days under room temperature and pressure.

The components of the liquid suspension 10 can be combined using any mixing device compatible with the composition as known to one of ordinary skill in the art, for example a batch mixer or recirculating mixer. Similarly, the components of the salt solution 20 can be combined using any mixing device compatible with the composition as known to one of ordinary skill in the art, for example a batch mixer or recirculating mixer.

The cementitious composition can be placed into a wellbore as a single stream and set downhole to form a set rigid mass. In embodiments, the cementitious composition 30 can be placed downhole through the drill bit forming a composition that substantially eliminates lost circulation. In embodiments, the cementitious composition 30 can be formed downhole by the mixing of a first stream comprising the liquid suspension 10 and a second stream comprising the salt solution 20. Alternatively, the cementitious composition 30 can be formed downhole by the mixing of a first stream comprising the liquid suspension downhole with water and/or salt naturally present downhole.

Methods for introducing compositions into a wellbore to seal subterranean zones are described in U.S. Pat. Nos. 5,913,364; 6,167,967; and 6,258,757, the disclosure of each of which is incorporated by reference herein in its entirety.

The cementitious composition 30 of this disclosure can develop an appreciable compressive strength when placed downhole. Herein the compressive strength is defined as the capacity of a material to withstand axially directed pushing forces. The maximum resistance of a material to an axial force is determined in accordance with API Recommended Practices 10B. Twenty Second Edition, December 1997. Beyond the limit of the compressive strength, the material becomes irreversibly deformed and no longer provides structural support and/or zonal isolation. The compressive strength a cement formation attains is a function of both the cement maturity (or cure time) and the temperature at which setting occurs. The cement maturity specifically refers to the time the cement formulation is allowed to set.

In embodiments, the cementitious composition 30 may develop a compressive strength of from about 50 psi to about 20,000 psi, from about 100 psi to about 10,000 psi, or from about 1000 psi to about 10,000 psi. The compressive strength of the cementitious composition 30 can develop in from about 15 minutes to greater than or equal to about 24 hours, from about 20 minutes to about 10 hours, or from about 30 minutes to about 8 hours, in embodiments. The compressive strength that develops can be directly proportional to the amount of metal oxide 11 and metal salt 21 in cementitious composition 30. Consequently, increasing the amount of metal oxide 11 and metal salt 21 components in the cementitious composition can result in an increased final compressive strength of the set composition 40.

The cementitious composition 30 can have a density from about 4 lb/gallon (ppg) to about 25 ppg, from about 12 ppg to about 17 ppg, or from about 6 ppg to about 14 ppg. Density reducing additives, such as glass beads or foam and expanding additives such as gas, suspension aids, defoamers and the like may be included in the cementitious composition 30 to generate a lightweight cement slurry.

In embodiments, the cementitious composition 30 (e.g., wellbore servicing fluid) has a specific gravity of from about 0.5 to about 3, alternatively from about 1.1 to about 2.5, alternatively from about 1.3 to about 2.3, or alternatively from about 1.5 to about 2.0.

In embodiments, the cementitious composition 30 (e.g., wellbore servicing fluid) has a mixability rating of from about 3 to about 5, alternatively from about 4 to about 5. The mixability rating is on a 0 to 5 scale, where 0 is not mixable and 5 is fully mixable.

In embodiments, the cementitious composition 30 (e.g., wellbore servicing fluid) has a fluid loss of from about 10 mL per 30 minutes to about 250 mL per 30 minutes, alternatively from about 20 mL per 30 minutes to about 1 mL per 30 minutes, or alternatively from about 30 mL per 30 minutes to about 50 mL per 30 minutes, when measured on a 325 mesh screen at about 129° F. and 1,000 psig differential pressure, in accordance with test standard API-RP-10B-2.

In embodiments, the cementitious composition 30 (e.g., wellbore servicing fluid) has a 10-second static gel strength of from about 1 to about 50, alternatively from about 5 to about 40, or alternatively from about 10 to about 30, when measured at about 129° F. in accordance with the test standard API-RP-10B-2. In embodiments, the wellbore servicing fluid has a 10-minute static gel strength of from about 1 to about 300, alternatively from about 5 to about 150, or alternatively from about 10 to about 75, when measured at about 129° F. in accordance with the test standard API-RP10B-2.

In embodiments, the cementitious composition 30 (e.g., wellbore servicing fluid) has a thickening time of from about 3 hours to about 24 hours, alternatively from about 4 hours to about 16 hours, or alternatively from about 5 hours to about 8 hours, when measured in accordance with the test standard API-RP-10B-2 to achieve about 70 Bearden units (Bc) at about 129° F. and 5,000 psig.

In embodiments, the cementitious composition 30 (e.g., wellbore servicing fluid) has a 50 psi Ultrasonic Cement Analyzer (UCA) compressive strength of from about 1 hour to about 48 hours, alternatively from about 4 hours to about 24 hours, or alternatively from about 6 hours to about 18 hours, when measured at about 168° F. and 5,000 psig.

In embodiments, the cementitious composition 30 (e.g., wellbore servicing fluid) has a 500 psi UCA compressive strength of from about 2 hours to about 72 hours at, alternatively from about 6 hours to about 36 hours, or alternatively from about 8 hours to about 24 hours, when measured at about 168° F. and 5,000 psig in accordance with the test standard API-RP-10B-2.

In embodiments, the cementitious composition 30 (e.g., wellbore servicing fluid) has a 24 hr UCA compressive strength of from about 50 psig to about 10,000 psig, alternatively from about 250 psig to about 6,000 psig, or alternatively from about 500 psig to about 4,000 psig, when measured at about 168° F. and 5,000 psig in accordance with the test standard API-RP-10B-2.

In embodiments, the cementitious composition 30 (e.g., wellbore servicing fluid) has rheology readings in a range of from about 1 to about 350 at about 68° F., alternatively from about 2 to about 350 at about 129° F., or alternatively from about 2 to about 350 at about 190° F., when measured by a FANN® Model 35 viscometer at a speed of 3 rpm to 300 rpm in accordance with the test standard API-RP-10B-2.

In embodiments, after being cured at about 212° F. and 5,000 psig for about 7 days, the wellbore servicing fluid (e.g., cementitious fluid) forms a set cement 40 having a crush compressive strength of from about 500 psig to about 12,000 psig, alternatively from about 1,500 psig to about 9,000 psig, or alternatively from about 3,000 psig to about 7,000 psig.

In embodiments, after being cured at about 212° F. and 5,000 psig for about 7 days, the cementitious composition 30 (e.g., wellbore servicing fluid) forms a set cement having a Young's Modulus of from about 0.3 Mpsig to about 3 Mpsig, alternatively from about 0.8 Mpsig to about 2 Mpsig, or alternatively from about 1.2 Mpsig to about 1.6 Mpsig.

In embodiments, after being cured at about 212° F. and 5,000 psig for about 7 days, the cementitious composition 30 (e.g., wellbore servicing fluid) forms a set cement 40 having a Brazilian Tensile Strength of from about 50 psig to about 1,600 psig, alternatively from about 100 psig to about 900 psig, or alternatively from about 200 psig to about 700 psig.

A cementitious composition 30 of the type disclosed herein can be prepared using any suitable method. In embodiments, a method of making the cementitious composition 30 comprises contacting the liquid suspension 10 with salt solution 20, to form the cementitious composition 30.

In embodiments, the cementitious composition 30 (e.g., wellbore servicing fluid) can be prepared at the wellsite. Components (e.g., liquid suspension 10, salt solution 20, or components thereof) of the cementitious composition 30 can be transported to the wellsite and combined (e.g., mixed/blended) proximate the wellsite to form the cementitious composition 30. The components (e.g., liquid suspension 10 and salt solution 20) of the cementitious composition 30 can be added into a container (e.g., a blender tub, for example mounted on a trailer), and the wellbore servicing fluid is then blended until the cementitious composition 30 becomes a pumpable fluid.

The methods disclosed herein for preparing the cementitious composition 30 (e.g., wellbore servicing fluid) can comprise a continuous process (also referred to as an "on-the-fly" process). A continuous process or an "on-the-fly" process means one or more steps in the process are running on a continuous basis. For example, a contacting step can be continuous in which cementitious composition 30 components are contacted in a container (e.g., a blender or mixer) in a manner that yields an about constant output of the wellbore servicing fluid from the container. The pumps, the blender, and other process equipment can operate at about steady state conditions during a continuous process, with the understanding that one or more operational parameters (e.g., rate, pressure, etc.) in the continuous process can be adjusted during the process. The continuous process can be performed by using proper equipment (e.g., a mixer, a blender, feeders, pumps, etc.) and process management/control. For example, forming the liquid suspension 10 can be continuous using pumps, solids feeder, and a blender; forming the salt solution 20 (when not already downhole) can be continuous using a blender; and/or forming the cementitious composition 30 can be continuous using a blender to combine the liquid suspension 10 and salt solution 20.

In embodiments, a cementitious composition 30 of the type disclosed herein can be prepared using any suitable method. In embodiments, a method of making the cementitious composition 30 comprises contacting liquid suspension 10 and salt solution 20 using the methods disclosed hereinabove at a location proximate a wellsite. The wellsite can comprise an offshore platform (e.g., an offshore oil and gas platform) and/or a floating vessel and the wellbore can be offshore.

As noted herein, the cementitious composition 30 of this disclosure can be utilized as a wellbore servicing fluid. As used herein, a "servicing fluid refers to a fluid used to drill, complete, work over, fracture, repair, or in any way prepare a wellbore for the recovery of materials residing in a Subterranean formation penetrated by the wellbore. It is to be understood that "subterranean formation' encompasses both areas below exposed earth and areas below earth covered by water such as ocean or fresh water. Examples of servicing fluids include, but are not limited to cement slurries, drilling fluids or muds, spacer fluids, fracturing fluids or completion fluids. Without limitation, servicing the wellbore includes positioning the cementitious composition 30 in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; to seal an annulus between the wellbore and an expandable pipe or pipe string; or a combination thereof.

In embodiments, the cementitious composition 30 can be introduced to the wellbore to prevent the loss of aqueous or non-aqueous drilling fluids into loss-circulation zones, such as voids, vugular zones, and natural or induced fractures while drilling. The cementitious composition 30 can form a non-flowing, intact mass inside the loss-circulation zone, which plugs the zone and inhibits loss of subsequently pumped drilling fluid, which allows for further drilling. For example, the cementitious composition 30 can function as a plug that is placed into an annulus of the wellbore and prepares the formation for placement of a second (e.g. cementitious) composition.

In embodiments, when placed in a wellbore, the cementitious composition 30 can be allowed to set such that it isolates the subterranean formation from a different portion of the wellbore. The set cementitious composition 40 can thus form a barrier that prevents fluids in that subterranean formation from migrating into other subterranean formations. In embodiments, the wellbore in which the composition 30 is positioned belongs to a multilateral wellbore configuration. It is to be understood that a multilateral wellbore configuration includes at least two principal wellbores connected by one or more ancillary wellbores.

In embodiments, the cementitious composition 30 can serve as a gravel packing fluid in gravel-packing operations. Herein, gravel packing refers to a method commonly utilized to prevent migration of sand into wells and to maintain the integrity of a subterranean formation. In gravel packing, a permeable screen can be placed against the face of a subterranean formation, followed by packing gravel against the exterior of the screen. The size of the gravel particles used for this purpose can be larger than the sand particles, but also sufficiently small to ensure that sand cannot pass through voids between the particles. The gravel is typically carried to the subterranean formation by suspending the gravel in a so-called gravel packing fluid and pumping the fluid to the formation. The screen blocks the passage of the gravel, but not the fluid, into the subterranean formation, such that the screen prevents the gravel from being circulated out of the hole, which leaves it in place. The gravel can be separated from the fluid as the fluid flows through the screen leaving it deposited on the exterior of the screen.

In embodiments, the cementitious composition 30 can be used for plug and abandonment of a well, e.g., to prepare a well to be shut in and permanently isolated. A series of plugs comprising the cementitious composition 30 may be positioned in the wellbore, allowed to set to form set cement 40, and tested at each stage for hydraulic isolation.

In embodiments, the cementitious composition 30 can serve as a spot fluid. A spot fluid herein refers to a small volume or pill of fluid placed in a wellbore annulus that may displace another wellbore servicing fluid, such as, for example, a mud. The spot fluid can act as a settable fluid, that when used will displace another wellbore servicing fluid from a crack or crevice in the wellbore and solidify to prevent flow of other wellbore servicing fluids into said cracks or crevices.

Also disclosed herein is a method of treating a wellbore. The method comprises providing the cementitious composition 30 of this disclosure (e.g., placing the cementitious composition 30 downhole or in another desired location) and allowing the cementitious composition to set to form a hardened or "set" cement composition (also referred to herein simply as a "set cement"). The cementitious composition 30 can be placed downhole during a wellbore treatment operation comprising an intervention, such as, and without limitation, lost circulation treatment, casing leak treatment, squeeze cementing, fluid inflow/outflow prevention, or a combination thereof.

Figure 2:
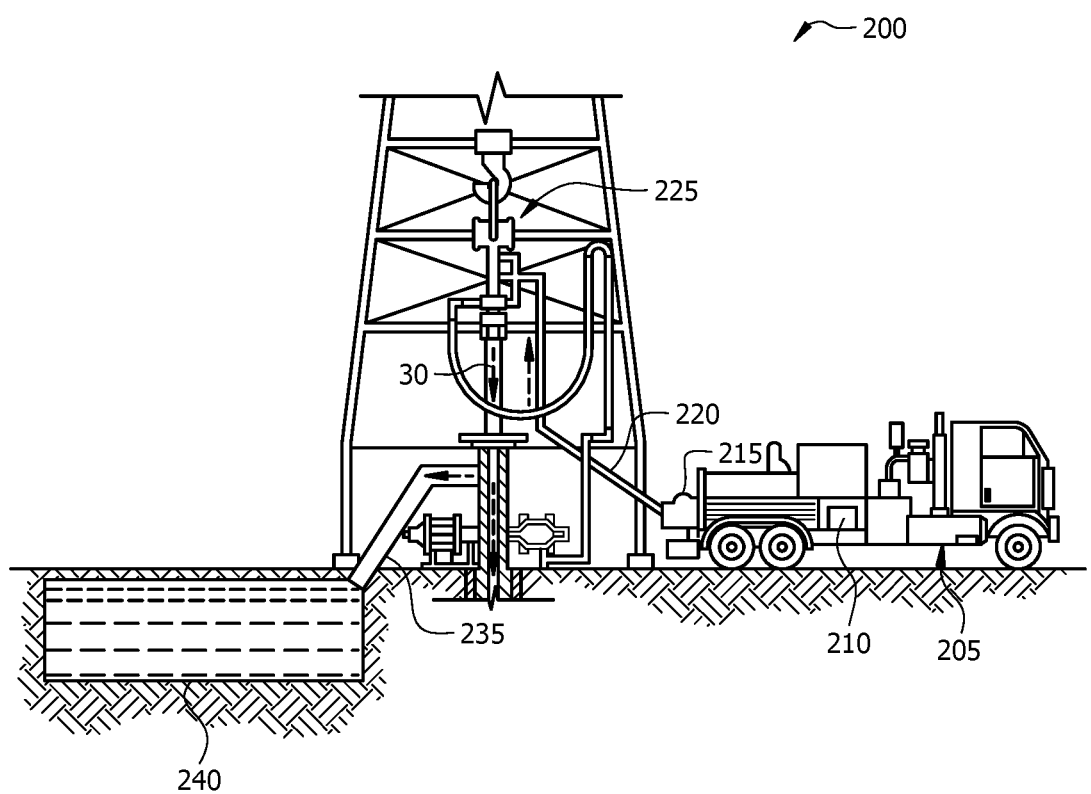
FIG. 2 is a schematic of surface equipment that can be utilized in the placement of a cementitious composition, according to embodiments disclosure.

An example cementing technique using a cementitious composition 30 will now be described with reference to FIG. 2 and FIG. 3. FIG. 2 illustrates surface equipment 200 that can be used in the placement of a cementitious composition 30 in accordance with certain examples. It will be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 200 can include a cementing unit 205, which can include one or more cement trucks. The cementing unit 205 can include mixing equipment 210 and pumping equipment 210 as will be apparent to those of ordinary skill in the art. Cementing unit 205, or multiple cementing units 205, can pump a cementitious composition 30 of the type disclosed herein through a feed pipe 220 and to a cementing head 225 which conveys the cementitious composition 14 downhole. Cementitious composition 14 can displace other fluids present in the wellbore, such as drilling fluids and spacer fluids, which can exit the wellbore through an annulus and flow through pipe 235 to mud pit 240.

Figure 3:
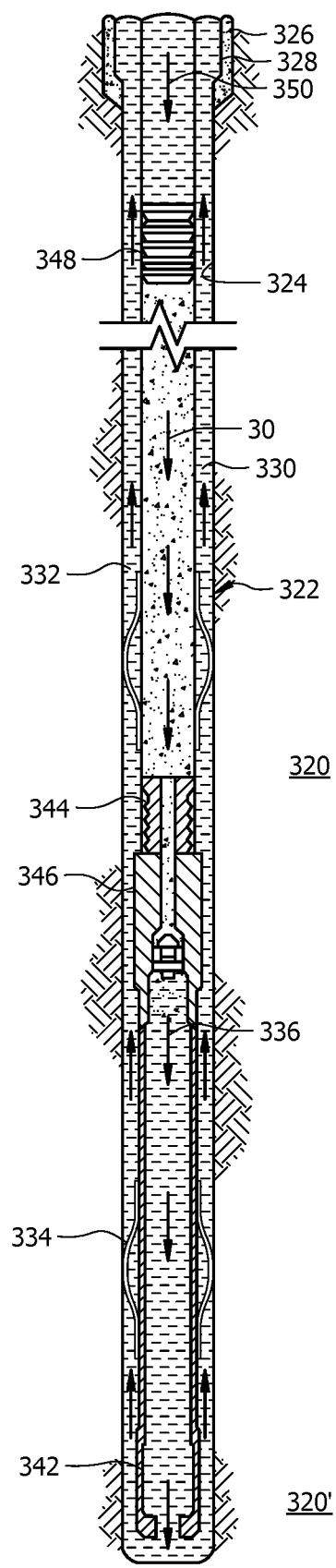
FIG. 3 is a schematic of the placement of a cementitious composition into a subterranean formation, according to embodiments of the disclosure.

Referring to FIG. 3, the cementitious composition 30 can be placed into a subterranean formation 320 in accordance with example embodiments. As illustrated, a wellbore 322 can be drilled into the subterranean formation 320. While wellbore 322 is shown extending generally vertically into the subterranean formation 320, the principles described herein are also applicable to wellbores that extend at an angle through the subterranean formation 320, such as horizontal and slanted wellbores. As illustrated, the wellbore 322 comprises walls 324 of the wellbore 322. In the illustrated embodiment, a surface casing 326 has been inserted into the wellbore 322. The surface casing 326 can be cemented to the walls 324 of the wellbore 322 by cement sheath 328. In the illustrated embodiment, one or more additional conduits (e.g., intermediate casing, production casing, liners, etc.), shown here as casing 330 can also be disposed in the wellbore 322. As illustrated, there is a wellbore annulus (e.g., annular space) 332 formed between the casing 330 and the walls 324 of the wellbore 322 and/or the surface casing 326. One or more centralizers 334 can be attached to the casing 330, for example, to centralize the casing 330 in the wellbore 322 prior to and during the cementing operation.

With continued reference to FIG. 3, the cementitious composition 30 can be placed (e.g., pumped) down the interior of the casing 330. The cementitious composition 30 can be allowed to flow down the interior of the casing 330 through the casing shoe 342 at the bottom of the casing 330 and up around the casing 330 into the wellbore annulus 332. The cementitious composition 30 can be allowed to set in the wellbore annulus 332, for example, to form a cement sheath that supports and positions the casing 330 in the wellbore 322. Other techniques can also be utilized for introduction of the cementitious composition 330. By way of example, reverse circulation techniques can be used that includes introducing the cementitious composition 30 into the subterranean formation 320 by way of the wellbore annulus 332 instead of through the casing 330. In such embodiments, the method comprises circulating the cementitious composition 30 down through the wellbore annulus 332 and back up through the interior of the casing 330.

In embodiments, the cementitious composition 30 displaces other fluids 36, such as drilling fluids and/or spacer fluids that can be present in the interior of the casing 330 and/or the wellbore annulus 332. At least a portion of the displaced fluids 336 can exit the wellbore annulus 332 via a flow line and be deposited, for example, in one or more retention pits (e.g., a mud pit 240 in FIG. 2). A bottom plug 344 can be introduced into the wellbore 322 ahead of the cementitious composition 30, for example, to separate the cementitious composition 30 from the fluids 336 that can be inside the casing 330 prior to cementing. After the bottom plug 344 reaches the landing collar 346, a diaphragm or other suitable device can rupture to allow the cementitious composition 30 through the bottom plug 344. In FIG. 3, the bottom plug 344 is shown on the landing collar 346. In the illustrated embodiment, a top plug 348 can be introduced into the wellbore 322 behind the cementitious composition 30. The top plug 348 can separate the cementitious composition 30 from a displacement fluid 350 and also push the cementitious composition 30 through the bottom plug 244.

In embodiments, the method disclosed herein further comprises circulating the cementitious composition down through a conduit (e.g., casing) and back up through an annular space (also referred to as an annulus or a wellbore annulus) between an outside wall of the conduit and a wall of the wellbore. In some other embodiments, the method disclosed herein further comprises circulating the cementitious composition down through an annular space between an outside wall of a conduit and a wall of the wellbore and back up through the conduit. The method can further comprise allowing at least a portion of the cementitious composition to set.

A method of servicing a wellbore penetrating a subterranean formation can comprise placing a cementitious composition 30 of the type disclosed herein into the wellbore 322, and allowing at least a portion of the cementitious composition to set.

In embodiments, the cementitious composition 30 is introduced into to prevent fluid inflow or outflow to or from the wellbore 322, for example, to prevent fluid flow into a lost circulation zone 320'. For example, in embodiments, a method of this disclosure comprises introducing cementitious composition 50 downhole (e.g., proximate a location of a lost circulation zone 320' or another area where fluid inflow or outflow is to be prevented), wherein, as described hereinabove, the cementitious composition 30 comprises a liquid suspension 10 (and optionally a salt solution 20, if the salt solution 20 is not present downhole); and allowing the cementitious composition 30 to set (e.g., to provide a hardened cement 40) that at least partially prevents the targeted fluid inflow or outflow.

A wellbore servicing fluid of the type disclosed herein can be used as a cementitious composition 30 (e.g., a Sorel-type cement). The method of the present disclosure can further comprise placing the cementitious composition 30 in an (onshore or offshore) wellbore penetrating a subterranean formation and allowing at least a portion of the well bore servicing fluid to set. The cementitious composition 30 can be used to permanently seal the annular space between the conduit (e.g., casing) and the well bore wall or the annular space between two casings. The cementitious composition 30 can alternatively or additionally be used to seal formations to prevent loss of drilling fluid (e.g., in squeeze cementing operations) and/or for operations ranging from setting kick-off plugs to plug and abandonment of a wellbore.

In embodiments, a cementitious composition 30 (e.g., wellbore servicing fluid) of the type disclosed herein can be employed in well completion operations such as primary and secondary cementing operations. The cementitious composition 30 can be placed into an annulus of the wellbore (e.g., an annulus formed between casing and a wellbore wall) and allowed to set such that it isolates the subterranean formation from a different portion of the wellbore. The cementitious composition 30 can thus set to form a barrier of set cement 40 that prevents fluids in that subterranean formation from migrating into other subterranean formations. Within the annulus, the cementitious composition 30 can also serve to support a conduit, e.g., casing, in the wellbore. In embodiments, the wellbore in which the cementitious composition 30 is positioned belongs to a multilateral wellbore configuration. It is to be understood that a multilateral wellbore configuration includes at least two principal wellbores connected by one or more ancillary wellbores.

In secondary cementing, often referred to as squeeze cementing, the cementitious composition 30 (e.g., wellbore servicing fluid) can be strategically positioned in the wellbore to plug a void or crack in the conduit, to plug a void or crack in the hardened sealant (e.g., cement sheath) residing in the annulus, to plug a relatively small opening known as a micro-annulus between the hardened sealant and the conduit, to plug a permeable zone, and so forth.

Various benefits may be realized by utilization of the presently disclosed methods and compositions. Stable suspensions 10 of metal oxide (e.g., MgO, ZnO) in glycol (e.g., monoethylene glycol (MEG) and polyethylene glycol (PEG)) for application in cement slurries 30 are disclosed herein. The metal oxide (e.g., MgO, ZnO) liquid suspension 10 of this disclosure may be combined with a salt solution 20 (e.g., a salt solution 10 comprising $MgCl_2$; $ZnCl_2$; $MgSO_4$; $ZnSO_4$) to produce a cementitious mixture 30, which may be used for a variety of well intervention operations.

The stable metal oxide (e.g., MgO, ZnO) liquid suspension 10 may be manufactured at a first location (e.g., a plant, first jobsite, etc.) and supplied (e.g., transported, or otherwise sent/delivered) to various locations globally. Combination with the salt solution 20 can be simplified, such that the cement composition 30 may be utilized in locations (e.g., at jobsites, wellsites, etc.) with limited equipment and mixing capabilities, such as production platforms and remote locations.

A stable liquid suspension 10 of the metal oxide(s) (e.g., MgO, ZnO) can obviate clumping issues commonly observed when utilizing powdered metal oxide (e.g., MgO, ZnO), and can permit more efficient mixing operations at the jobsite (e.g., wellsite, rigsite, etc.), by enabling liquid-liquid mixing of stable, liquid metal oxide suspension 10 and liquid salt solution 20, for example, and can result in a more consistent cementitious mixture/composition 30.

In embodiments, the metal oxide (e.g., MgO, ZnO) liquid suspension 10 may be pumped into well 322 singularly (e.g., to form magnesium hydroxide with water contained within the well).

The metal oxide suspension 10 and the salt solution 20 can be prepared at the (e.g., same) location (e.g., rig site, wellsite) or a location proximate. Alternatively, the metal oxide suspension 10, the salt solution 20, or both can be prepared away from the site of injection downhole and transported thereto. At the rig site, the two liquids (i.e., liquid suspension 10 and salt solution 20) can be combined and pumped into the well during intervention operation(s). As noted herein, the metal oxide liquid suspension 10 and the salt solution 20 can be mixed in any desired ration, e.g., in a ratio of 4:1, 3:1, 2:1, 1:1, 1:2, 1:3, 1:4 or a ratio in between. After pumping into the well, the liquid suspension 10 and the salt solution 20 can undergo reaction to form a Sorel-type cement (e.g., comprising metal (e.g., magnesium) oxychlorides, metal (e.g., magnesium) oxysulfates, and/or metal (e.g., magnesium) hydroxides, or the like, in various ratios).

An advantage of the present disclosure can be that the liquid suspension 10 used in the disclosed cementitious compositions 30 and methods is easier to handle and allows improved accuracy with regard to metering an amount to add to a system, compared with a dry powder expansion agent. For example, some fluid preparation systems that cannot process a dry powder expansion agent due to limited equipment/tools (e.g., equipment/tools at an offshore platform) can process the liquid suspension 10. The liquid suspension 10 can be stable for more than 7 days, which allows a sufficient time for transportation and storage.

A pumpable liquid suspension 10 containing metal oxide 11 (e.g., MgO) may advantageously allow for using the liquid suspension 10 in offshore cementing operations without adding the metal oxide 11 as a dry component. The liquid suspension 10 can be transported to the offshore rig as a liquid, stored (e.g., in a chemical room) and used on an as needed basis.

The liquid suspension 10 as disclosed herein (e.g., MgO metal oxide 11 in glycol 12 suspension) can allow for pumping particulate material (e.g., metal oxide 11, such as MgO) as a liquid. When the liquid suspension 10 comprises MgO, the liquid suspension 10 may advantageously prevent MgO hydration to $Mg(OH)_2$ prior to use. The liquid suspension 10 as disclosed herein may advantageously contain more than 40 wt % MgO, which can be enabled via the use of suspension aid 13. In embodiments, a surfactant 14, such as an alcohol alkoxylate surfactant (e.g., alcohol ethoxylate surfactant), can be added to liquid suspension 10 to maintain free flow of the liquid suspension 10 and avoid gelation. Conventional ways of introducing metal oxide 11 to a cementitious fluid (e.g., as a dry powder/particulate) are not highly effective for materials as dense as MgO and require a relatively higher level of rheological control. The liquid suspension of this disclosure overcomes the limitations of conventional methods which can suffer from gelation/separation concerns.

Inclusion of surfactant 14, such as an alcohol alkoxylate surfactant (e.g., alcohol ethoxylate surfactant), with glycol 12, such as MEG and/or PEG, can advantageously prevent the development of strong gels, maintain product fluidity, reduce fluid separation, and mitigate hard packing of the solids during storage. The liquid suspension 10 as disclosed herein can contain a surfactant 14, such as an alcohol alkoxylate surfactant (e.g., alcohol ethoxylate surfactant). Surfactant 14 (e.g., an alcohol alkoxylate surfactant) can prevent/reduce gelation, and thus maintain the ability of the liquid suspension 10 to free flow. Consequently, wellbore servicing operations may be significantly facilitated, and/or the suspension of metal oxide 11 particulate in organic carrier fluid may be prevented via the incorporation of the surfactant (e.g., an alcohol alkoxylate surfactant). Combination of the surfactant 14 (e.g., an alcohol ethoxylate surfactant) with glycol 12 (e.g., MEG) may advantageously prevent gelation when the liquid suspension 10 is added to salt solution 20. The concentration of suspension aid 13 in the liquid suspension 10 can be utilized to advantageously control rheological parameters such as yield point and plastic viscosity. In embodiments, the liquid suspension 10 as disclosed herein advantageously prevents the metal oxide 11 (e.g., MgO) from hydrating or reducing the hydration rate (e.g., restricting or retarding hydration) of the metal oxide 11 (e.g., MgO). In embodiments, the liquid suspension 10 as disclosed herein advantageously provides an improved shelf-life for the liquid suspension 10. For example, the liquid suspension 10 can provide for stable suspension of the metal oxide 11 (e.g., a shelf-life stability) of greater than or equal to 1, 3, 6, 9, or 12 months from the date of mixing of the components to form the liquid suspension 10.

Many modifications or expansions upon the invention and the various illustrative embodiments described in this application still fall within the spirit and scope of the invention, and should be so considered.

EXAMPLES

The embodiments having been generally described, the following Examples are given as a particular embodiment of the disclosure and to demonstrate the practice and advantages thereof. It is understood that the Examples are given by way of illustration and are not intended to limit the specification or the claims in any manner.

Example 1

A liquid metal oxide suspension 10 comprising magnesium oxide (MgO) was prepared by combining 236.0 g of calcined MgO as metal oxide 11, 336.3 g of PEG (200 MW) as glycol 12, 8.8 g of fumed silica as suspension aid 13, and 8.8 g of alcohol ethoxylate as surfactant 14. A metal salt solution (liquid) comprising magnesium chloride was prepared by combining 225 g $MgCl_2$ as metal salt 21, 225 g water 22, 0.3 g of diutan gum as viscosifier 23, and 2.25 g of sodium hexametaphosphate as set retarder 24. The MgO suspension 10 and the $MgCl_2$ salt solution 20 were combined in a weight ratio of 1 to 0.64 to provide cementitious composition 30. Cementitious composition 30 was a pumpable mixture of the MgO suspension and the $MgCl_2$ solution, and exhibited the viscometer readings shown in Table 1.

TABLE 1

| Rheology Dial Readings from The Example | |
|---|---|
| RPM | Dial Reading (Up/Down) |
| 3 | 5/4 |
| 6 | 6/5 |
| 30 | 21/18 |
| 60 | 28/32 |
| 100 | 105/98 |
| 300 | 149 |

The cementitious composition 30 was cured at 190° F. (87.8° C.) in water bath to form a cured composition 40 that had a gel strength greater than 15,000 lbr/ft$^3$ (240,277 kg/m$^3$).

Example 2

Twenty three samples were formed as per Table 2.

Samples 1-10 contained MEG from Fisher, samples 11-13 contained MEG from Univar, samples 14 and 17 contained Univar 80/20 MEG/PEG1000, samples 15 and 16 contained Univar PPG 1000 TB, samples 18 and 19 contained Univar 75/25 MEG/PEG1000, and samples 20-23 contained Univar PEG 200.

Samples 1-13 contained silica MFIL P(U) available from Madhu Silica, samples 14-23 contained silica Aerosil 150 available from Evonik Corporation.

TABLE 2

Samples from Example 2

| Sample | Glycol(g) | SA-1015 (g) | MgO (g) | Si (g) | Surfactant (g) | Total Mass (g) | Total Volume (mL) | SG | <325 |
|---|---|---|---|---|---|---|---|---|---|
| 1 | 476.64 | 0.4 | 550 | 34.2 | 30 | 1091.24 | 629.24 | 1.73 | Y |
| 2 | 404 | 1 | 520 | 40 | 35 | 1000 | 563.80 | 1.77 | Y |
| 3 | 442 | 0.5 | 520 | 20 | 17.5 | 1000 | 570.14 | 1.75 | Y |
| 4 | 439 | 1 | 520 | 40 | 0 | 1000 | 559.25 | 1.79 | Y |
| 5 | 479 | 1 | 520 | 0 | 0 | 1000 | 576.24 | 1.74 | Y |
| 6 | 444 | 1 | 520 | 0 | 35 | 1000 | 580.79 | 1.72 | Y |
| 7 | 429.15 | 0.85 | 520 | 20 | 30 | 1000 | 571.68 | 1.75 | Y |
| 8 | 507.96 | 0.13 | 441.72 | 36.45 | 14.73 | 1000 | 612.61 | 1.63 | N |
| 9 | 507.96 | 0.13 | 441.72 | 36.45 | 14.73 | 1000 | 612.61 | 1.63 | N |
| 10 | 491.8 | 0.13 | 441.72 | 36.35 | 30 | 1000 | 613.75 | 1.63 | N |
| 11 | 507.96 | 0.13 | 441.72 | 36.45 | 14.73 | 1000 | 612.61 | 1.63 | N |
| 12 | 523.24 | 0.06 | 425.52 | 36.45 | 14.73 | 1000 | 621.84 | 1.61 | N |
| 13 | 548.64 | 0.1 | 400.08 | 36.45 | 14.73 | 1000 | 637.71 | 1.57 | N |
| 14 | 575 | 0 | 400 | 10 | 15 | 1000 | 649.05 | 1.54 | N |
| 15 | 464 | 0 | 320 | 4 | 12 | 800 | 520.94 | 1.54 | N |
| 16 | 577.5 | 0 | 400 | 7.5 | 15 | 1000 | 650.11 | 1.54 | N |
| 17 | 570 | 0 | 400 | 15 | 15 | 1000 | 646.92 | 1.55 | N |
| 18 | 579 | 0 | 400 | 6 | 15 | 1000 | 650.75 | 1.54 | N |
| 19 | 570 | 0 | 400 | 15 | 15 | 1000 | 646.92 | 1.55 | N |
| 20 | 570 | 0 | 400 | 15 | 15 | 1000 | 646.92 | 1.55 | N |
| 21 | 530 | 0 | 440 | 15 | 15 | 1000 | 621.97 | 1.61 | N |
| 22 | 550 | 0 | 420 | 15 | 15 | 1000 | 634.45 | 1.58 | N |
| 23 | 570 | 0 | 400 | 15 | 15 | 1000 | 646.92 | 1.55 | N |

Samples 1-7 contained MgO from Martin Marietta, while samples 8-23 contained MgO (e.g., MB M) from Halliburton Energy Services.

Samples 1-8 contained surfactant Lutensol XP50 available from BASF, while samples 9-22 contained surfactant Cleanbore B available from Halliburton Energy Services, and sample 23 contained surfactant Aubin RD-351-1 available from Aubin Chemicals.

TABLE 3

Data from Example 2

| Sample | T mix | PV cond (cP) | PV 1 wk (cP) | YP cond (lb/100 ft²) | YP 1 wk (lb/100 ft²) | Free Fluid (1 wk) | 10 s gel | 10 min gel | 10 s gel 1 wk | 10 min gel 1 wk |
|---|---|---|---|---|---|---|---|---|---|---|
| 1 | 90.5 | 244 | 254 | 1.86 | 3.43 | 0.29 | 5.6 | 7.8 | 5.7 | 6.5 |
| 2 | 108.6 | 962 | 1112 | 32.01 | 20.4 | 0.07 | 46 | 75.1 | 42.1 | 48.3 |
| 3 | | 528 | 213 | 1.77 | 6.7 | 0.1 | 8.6 | 20.3 | 8.2 | 9.2 |
| 4 | 87 | 1538 | 968 | 6.53 | 15.91 | 0.01 | 29.5 | 124 | 27.5 | 32.4 |
| 5 | 75.9 | 1346 | 472 | 7.7 | 26.29 | 0 | 28 | 55 | 30 | 41.6 |
| 6 | 76.1 | 1251 | 583 | 4.08 | 19.14 | 0.03 | 26 | 60.1 | 26 | 37.4 |
| 7 | 110 | 563.8 | 603.9 | 18.8 | 27.31 | 0.18 | 30.8 | 41.4 | 37.8 | 42.9 |
| 8 | 124.1 | 339.8 | 409.2 | 5.26 | 3.24 | 0 | 15.7 | 26.7 | 11.3 | 15.8 |
| 9 | 112.2 | 510.4 | 522.6 | 9.53 | 4.47 | 0 | 21.1 | 35.8 | 14.2 | 18.4 |
| 10 | 95.1 | 788.7 | 763.2 | 13.48 | 2.18 | 0.06 | 25.8 | 33.9 | 12.5 | 15.2 |
| 11 | 112.2 | 413.6 | 435.8 | 8.05 | 2.79 | | 17.8 | 35.1 | 10.2 | 14.7 |
| 12 | 132 | 176 | 216 | 0.31 | 0.52 | 0 | 4.1 | 8.5 | 3.1 | 3.9 |
| 13 | 103 | 212 | 220 | 7.3 | 1.23 | 0 | 14.6 | 24.3 | 4.6 | 6.4 |
| 14 | | 292.3 | 97.2 | 3.09 | 0.64 | 0.04 | 9.9 | 15.1 | 5.2 | 7.2 |
| 15 | 106 | 708.8 | 615.7 | 12.8 | 8.4 | 0.08 | 21.8 | 23.5 | 17.2 | 18.1 |
| 16 | 120 | 800 | 926 | 58.4 | 51.6 | 0 | 66 | 85.8 | 67.1 | 73.8 |
| 17 | 89.9 | 397 | 254.7 | 17.7 | 5.2 | 0.01 | 27.3 | 37.4 | 11.6 | 15.6 |
| 18 | | 280.1 | 230.2 | 1.96 | 0.67 | 0.09 | 7.2 | 8.1 | 4.4 | 5.3 |
| 19 | 98.9 | 441.9 | 330.6 | 22.05 | 7.2 | 0.03 | 31.9 | 46 | 15 | 19.2 |
| 20 | | 662.5 | 629.6 | 17.4 | 8.67 | 0.01 | 28.3 | 43.1 | 19.9 | 24.7 |

TABLE 3-continued

Data from Example 2

| Sample | T mix | PV cond (cP) | PV 1 wk (cP) | YP cond (lb/100 ft²) | YP 1 wk (lb/100 ft²) | Free Fluid (1 wk) | 10 s gel | 10 min gel | 10 s gel 1 wk | 10 min gel 1 wk |
|---|---|---|---|---|---|---|---|---|---|---|
| 21 | 112 | 1113.8 | 1212.5 | 60.53 | 34.32 | 0 | 75.4 | 100.4 | 53.5 | 71.2 |
| 22 | 109 | 777.7 | 817.9 | 24.96 | 15.27 | 0 | 40.8 | 66.6 | 27.8 | 33.8 |
| 23 | 98 | 601.1 | 692.5 | 17.68 | 11.9 | 0 | 28 | 44.6 | 23.4 | 28.3 |

ADDITIONAL DISCLOSURE

The following are non-limiting, specific embodiments in accordance with the present disclosure:

In a first embodiment, a liquid suspension comprises: a metal oxide; and a glycol, a glycol ether, or a combination thereof, wherein the liquid suspension is stable for at least about 60, 365, or 730 days under room temperature and pressure.

A second embodiment can include the liquid suspension of the first embodiment, wherein the metal oxide comprises magnesium oxide (MgO), zinc oxide (ZnO), or a combination thereof.

A third embodiment can include the liquid suspension of the first or the second embodiment, comprising from about 20 to about 70, from about 30 to about 60, or from about 40 to about 50 weight percent of the metal oxide based on the total weight of the liquid suspension.

A fourth embodiment can include the liquid suspension of any one of the first to third embodiments, wherein the metal oxide comprises magnesium oxide, non-calcined magnesium oxide, calcined magnesium oxide, lightly burned magnesium oxide, hard-burned magnesium oxide, dead-burned magnesium oxide, or a combination thereof.

A fifth embodiment can include the liquid suspension of any one of the first to fourth embodiments, wherein the glycol comprises an alkylene glycol, monoethylene glycol, propylene glycol, butylene glycol, polyalkylene glycol, polyethylene glycol, polypropylene glycol, polybutylene glycol, or a combination thereof; and wherein the glycol ether comprises ethylene glycol monomethyl ether, ethylene glycol monoethyl ether, propylene glycol monomethyl ether, propylene glycol monoethyl ether, butylene glycol monomethyl ether, butylene glycol monoethyl ether, or a combination thereof.

A sixth embodiment can include the liquid suspension of any one of the first to fifth embodiments, wherein the glycol comprises mono-ethylene glycol (MEG), polyethylene glycol (PEG), monopropylene glycol (MPG), dipropylene glycol (DPG), triethylene glycol (TEG), butylene glycol, or a combination thereof.

A seventh embodiment can include the liquid suspension of any one of the first to sixth embodiments, comprising from about 30 to about 80, from about 40 to about 70, or from about 50 to about 60 weight percent of the glycol based on the total weight of the liquid suspension.

An eighth embodiment can include the liquid suspension of any one of the first to seventh embodiments, comprising from about 30 to about 80, from about 40 to about 70, or from about 45 to about 55 weight percent of the mono ethylene glycol (MEG) and from about 10 to about 20, from about 10 to about 15, or from about 11 to about 14 weight percent of the poly ethylene glycol (PEG), based on the total weight of the liquid suspension.

A ninth embodiment can include the liquid suspension of any one of the first to eighth embodiments further comprising a surfactant.

A tenth embodiment can include the liquid suspension of the ninth embodiment, wherein the surfactant comprises alcohol alkoxylate surfactant (e.g., alcohol ethoxylate surfactant).

An eleventh embodiment can include the liquid suspension of the ninth or the tenth embodiment, wherein the surfactant is characterized by the general formula $R_1(OR_2)_n OH$, where n is from about 1 to about 30, where $R_1$ is an alkyl group having from about 3 to about 25 carbon atoms, where $R_1$ is characterized by a degree of branching of from 0 to about 5, and where $R_2$ is an alkylene group having from about 2 to about 5 carbon atoms.

A twelfth embodiment can include the liquid suspension of the eleventh embodiment, wherein R2 is ethylene and/or propylene.

A thirteenth embodiment can include the liquid suspension of any one of the ninth to twelfth embodiments, comprising from about greater than 0 to about 5, from about 1 to about 4, or from about 1.5 to about 3 weight percent of the surfactant based on the total weight of the liquid suspension.

A fourteenth embodiment can include the liquid suspension of any one of the first to thirteenth embodiments further comprising a suspension aid.

A fifteenth embodiment can include the liquid suspension of the fourteenth embodiment, wherein the suspension aid is a high surface area particle having a surface area of greater than or equal to about 50 m²/g (e.g., from about 25 to about 600 m²/g, from about 50 to about 300 m²/g, or from about 100 to about 200 m²/g).

A sixteenth embodiment can include the liquid suspension of the fourteenth or fifteenth embodiment, wherein the suspension aid comprises fumed silica, precipitated silica, fly ash, micro sand, micronized silica, colloidal silica, graphene, or a combination thereof.

A seventeenth embodiment can include the liquid suspension of the sixteenth embodiment, wherein the suspension aid comprises fumed silica.

Am eighteenth embodiment can include the liquid suspension of any one of the first to seventeenth embodiments, wherein the suspension aid comprises amorphous silica selected from non-mined amorphous silica, precipitated silica, fumed silica, silica fume, porous silica, micro-sized silica, nano-sized silica, or a combination thereof.

A nineteenth embodiment can include the liquid suspension of any one of the fourteenth to eighteenth embodiments, comprising from greater than zero to about 5, from about 1 to about 4, or from about 1.5 to about 3 weight percent of the suspension aid based on the total weight of the liquid suspension.

A twentieth embodiment can include the liquid suspension of any one of the first to nineteenth embodiments, having: a yield point, as determined in accordance with API RP 10B-2 $2^{nd}$ Edition 2013, in a range of from about 0.25 to about 75, from about 20 to about 65, or from about 5 to about 20 $lb_f$/100 $ft^2$; a 10-second gel strength, as determined in accordance with API RP 10B-2 $2^{nd}$ Edition 2013, in a range of from about 2 to about 80, from about 15 to about 75, or from about 5 to about 15 degrees of dial deflection using a viscometer having an R1 B1 F1 configuration; a 10-minute gel strength, as determined in accordance with API RP 10B-2 $2^{nd}$ Edition 2013, in a range of from about 2 to about 200, from about 8 to about 80, or from about 15 to about 35 degrees of dial deflection using a viscometer having an R1 B1 F1 configuration; and/or a plastic viscosity, as determined in accordance with API RP 10B-2 $2^{nd}$ Edition 2013, in a range of from about 5 to about 5000, from about 75 to about 2500, or from about 100 to about 1500 cP.

In a twenty first embodiment, a cementitious composition comprises: the liquid suspension of any of the first to twentieth embodiments; and a salt solution comprising a metal salt and water.

A twenty second embodiment can include the cementitious composition of the twenty first embodiment, wherein the metal salt comprises a metal chloride, a metal sulfate, a metal phosphate, or a combination thereof.

A twenty third embodiment can include the cementitious composition of the twenty first of twenty second embodiment, wherein the metal salt comprises magnesium chloride ($MgCl_2$), zinc chloride ($ZnCl_2$), magnesium sulfate ($MgSO_4$), zinc sulfate ($ZnSO_4$; $ZnSO_4$ ($H_2O_x$)), or a combination thereof.

A twenty fourth embodiment can include the cementitious composition of any one of the twenty first to twenty third embodiments, wherein the metal salt solution comprises from about 25 to about 75, from about 35 to about 70, or from about 50 to about 60 of the metal salt, from about 25 to about 75, from about 30 to about 60, or from about 40 to about 50 of the water, or from about 5 to about 30, from about 10 to about 25, or from about 15 to about 20 of the metal salt and from about 20 to about 90, from about 30 to about 80, or from about 40 to about 60 of the water, based on a total weight of the salt solution.

A twenty fifth embodiment can include the cementitious composition of any one of the twenty first to twenty fourth embodiments, wherein the metal oxide and the metal salt comprise a same metal.

A twenty sixth embodiment can include the cementitious composition of any one of the twenty first to twenty fifth embodiments, comprising (e.g., wherein the salt solution further comprises) a viscosifier, a set retarder, a biocide, or a combination thereof.

A twenty seventh embodiment can include the cementitious composition of the twenty sixth embodiment, comprising the viscosifier.

A twenty eighth embodiment can include the cementitious composition of the twenty seventh embodiment, wherein the salt solution comprises from greater than 0 to about 0.2, from about 0.01 to about 0.15 or from about 0.05 to about 0.1 weight percent of the viscosifier, based on a total weight of the salt solution.

A twenty ninth embodiment can include the cementitious composition of the twenty seventh or twenty eighth embodiment, wherein the viscosifier comprises biopolymer gum, guar gum, xanthan gum, welan gum, diutan, cellulose, hydroxyethyl cellulose (HEC), modified cellulose, diatomaceous earth, starch, modified and/or crosslinked starch, viscoelastic surfactants (VES), derivatives thereof, or a combination thereof.

A thirtieth embodiment can include the cementitious composition of any one of the twenty sixth to twenty ninth embodiments, comprising the set retarder.

A thirty first embodiment can include the cementitious composition of the thirtieth embodiment, wherein the salt solution comprises from about greater than 0 to about 2, from about 1 to about 2, or from about 0.5 to about 0.9 weight percent of the set retarder, based on a total weight of the salt solution.

A thirty second embodiment can include the cementitious composition of the thirtieth or thirty first embodiment, wherein the set retarder comprises sodium hexametaphosphate (e.g., technical grade granular), potassium magnesium phosphate hexahydrate, potassium magnesium hexametaphosphate or a combination thereof.

A thirty third embodiment can include the cementitious composition of any one of the twenty sixth to thirty second embodiments, comprising the biocide.

A thirty fourth embodiment can include the cementitious composition of the thirty third embodiment, wherein the salt solution comprises from about greater than 0 to about 0.1, from about 0.01 to about 0.09, or from about 0.05 to about 0.075 weight percent of the biocide, based on a total weight of the salt solution.

A thirty fifth embodiment can include the cementitious composition of any one of the twenty first to thirty fourth embodiments, comprising the liquid suspension and the salt solution in a weight ratio of about 4, 3, 2, or 1 to about 1, 2, 3, or 4 (e.g., a ratio of greater than less than, or equal to about 4:1, 3:1, 2:1, 1:1, 1:2, 1:3, or 1:4).

A thirty sixth embodiment can include the cementitious composition of any one of the twenty first to thirty fifth embodiments, having: a viscometer reading at 3 RPM, as determined in accordance with API RP 10B-2 $2^{nd}$ Edition 2013, of from about 1 to about 50, from about 5 to about 10, or from about 10 to about 25 degrees of dial deflection using a viscometer having an R1 B1 F1 configuration; a viscometer reading at 6 RPM, as determined in accordance with API RP 10B-2 $2^{nd}$ Edition 2013, of from about 2 to about 75, from about 5 to about 10, or from about 10 to about 30 degrees of dial deflection using a viscometer having an R1 B1 F1 configuration; a viscometer reading at 100 RPM, as determined in accordance with API RP 10B-2 $2^{nd}$ Edition 2013, of from about 10 to about 300, from about 20 to about 200, or from about 50 to about 65 degrees of dial deflection using a viscometer having an R1 B1 F1 configuration; a viscometer reading at 300 RPM, as determined in accordance with API RP 10B-2 $2^{nd}$ Edition 2013, of from about 20 to about 300, from about 50 to about 250, or from about 125 to about 175 degrees of dial deflection using a viscometer having an R1 B1 F1 configuration; or a combination thereof.

In a thirty seventh embodiment, a method of forming a cementitious composition comprises: combining a metal oxide, a glycol, optionally a suspension aid, and optionally a surfactant to provide a (e.g., stable metal oxide) liquid suspension; contacting the liquid suspension with a salt solution to form the cementitious composition.

A thirty eighth embodiment can include the method of the thirty seventh embodiment further comprising combining a metal salt, water and optionally a viscosifier, a set retarder, a biocide, or a combination thereof, to form the salt solution.

A thirty ninth embodiment can include the method of the thirty seventh or thirty eighth embodiment, wherein contacting the liquid suspension with the salt solution to form the cementitious composition comprises combining the liquid suspension with the salt solution in a weight ratio of about 4, 3, 2, or 1 to about 1, 2, 3, or 4 or any ratio thereamong (e.g., a ratio of greater than less than, or equal to about 4:1, 3:1, 2:1, 1:1, 1:2, 1:3, or 1:4).

A fortieth embodiment can include the method of any one of the thirty seventh to thirty ninth embodiments, wherein contacting the liquid suspension with the salt solution to form the cementitious composition is effected by pumping the metal oxide liquid suspension downhole in a formation and/or wellbore comprising the salt solution, whereby the liquid suspension contacts the salt solution.

A forty first embodiment can include the method of any one of the thirty seventh to fortieth embodiments, wherein combining the metal oxide, the glycol, the optionally the suspension aid, and the optionally the surfactant to provide the (e.g., stable metal oxide) liquid suspension is effected at a different jobsite than a jobsite at which contacting the liquid suspension with the salt solution to form the cementitious composition is effected.

A forty second embodiment can include the method of any one of the thirty seventh to forty first embodiments, wherein contacting the liquid suspension with the salt solution to form the cementitious composition provides a pumpable mixture (e.g., having a rheology that includes a viscometer reading at 3 RPM, as determined in accordance with API RP 10B-2 $2^{nd}$ Edition 2013, of from about 1 to about 50, from about 5 to about 10, or from about 10 to about 25 degrees of dial deflection using a viscometer having an R1 B1 F1 configuration; a viscometer reading at 6 RPM, as determined in accordance with API RP 10B-2 $2^{nd}$ Edition 2013, of from about 2 to about 75, from about 5 to about 10, or from about 10 to about 30 degrees of dial deflection using a viscometer having an R1 B1 F1 configuration; a viscometer reading at 100 RPM, as determined in accordance with API RP 10B-2 $2^{nd}$ Edition 2013, of from about 10 to about 300, from about 20 to about 200, or from about 50 to about 65 degrees of dial deflection using a viscometer having an R1 B1 F1 configuration; a viscometer reading at 300 RPM, as determined in accordance with API RP 10B-2 $2^{nd}$ Edition 2013, of from about 20 to about 300, from about 50 to about 250, or from about 125 to about 175 degrees of dial deflection using a viscometer having an R1 B1 F1 configuration; or a combination thereof).

A forty third embodiment can include the method of any one of the thirty seventh t forty second embodiments, wherein after contacting the liquid suspension with the salt solution to form the cementitious composition, the cementitious composition cures to form a gel strength in a range of from about 15,000 lb/ft² to about 20,000 lb/ft², from about 15,000 lb/ft² to about 17,000 lb/ft², or from about 15,000 lb/ft² to about 25,000 lb/ft² lb/ft².

A forty fourth embodiment can include the method of any one of the thirty seventh to forty third embodiments, wherein the liquid suspension is stable for at least about 30, 365, or 720 days under room temperature and pressure.

A forty fifth embodiment can include the method of any one of the thirty seventh to forty fourth embodiments, wherein the metal oxide comprises magnesium oxide (MgO), zinc oxide (ZnO), or a combination thereof.

A forty sixth embodiment can include the method of any one of the thirty seventh to forty fifth embodiments, wherein the liquid suspension comprises from about 20 to about 70, from about 30 to about 60, or from about 40 to about 50 weight percent of the metal oxide based on the total weight of the liquid suspension.

A forty seventh embodiment can include the method of any one of the thirty seventh to forty sixth embodiments, wherein the metal oxide of the liquid suspension comprises magnesium oxide (MgO), non-calcined magnesium oxide, calcined magnesium oxide, lightly burned magnesium oxide, hard-burned magnesium oxide, dead-burned magnesium oxide, or a combination thereof.

A forty eighth embodiment can include the method of any one of the thirty seventh to forty seventh embodiments, wherein the glycol of the liquid suspension comprises monoethylene glycol (MEG), polyethylene glycol (PEG), monopropylene glycol (MPG), dipropylene glycol (DPG), triethylene glycol (TEG), butylene glycol, or a combination thereof.

A forty ninth embodiment can include the method of any one of the thirty seventh to forty eighth embodiments, wherein the liquid suspension comprises from about 30 to about 80, from about 40 to about 70, or from about 50 to about 60 weight percent of the glycol based on the total weight of the liquid suspension.

A fiftieth embodiment can include the method of any one of the thirty seventh to forty ninth embodiments, wherein, based on the total weight of the liquid suspension, the liquid suspension comprises from about 30 to about 80, from about 40 to about 70, or from about 45 to about 55 weight percent of the mono ethylene glycol (MEG) and from about 10 to about 20, from about 10 to about 15, or from about 11 to about 14 weight percent of the poly ethylene glycol (PEG), based on the total weight of the liquid suspension.

A fifty first embodiment can include the method of any one of the thirty seventh to fiftieth embodiments, wherein the liquid suspension comprises the surfactant.

A fifty second embodiment can include the method of the fifty first embodiment, wherein the surfactant comprises alcohol alkoxylate surfactant (e.g., alcohol ethoxylate surfactant).

A fifty third embodiment can include the method of any one of the thirty seventh to fifty second embodiments, wherein the liquid suspension comprises from about greater than 0 to about 5, from about 1 to about 4, or from about 1.5 to about 3 weight percent of the surfactant based on the total weight of the liquid suspension.

A fifty fourth embodiment can include the method of any one of the thirty seventh to fifty third embodiments, wherein the liquid suspension comprises the suspension aid.

A fifty fifth embodiment can include the method of the fifty fourth embodiment, wherein the suspension aid of the liquid suspension comprises a high surface area particle having a surface area of greater than or equal to about 50 m²/g (e.g., from about 25 to about 600 m²/g, from about 50 to about 300 m²/g, or from about 100 to about 200 m²/g).

A fifty sixth embodiment can include the method of the fifty fifth embodiment, wherein the suspension aid comprises fumed silica, precipitated silica, fly ash, micro sand, micronized silica, colloidal silica, graphene, or a combination thereof.

A fifty seventh embodiment can include the method of any one of the fifty fourth to fifty sixth embodiments, wherein the liquid suspension comprises from greater than zero to about 5, from about 1 to about 4, or from about 1.5 to about 3 weight percent of the suspension aid based on the total weight of the liquid suspension.

A fifty eighth embodiment can include the method of any one of the thirty seventh to fifty seventh embodiments, wherein the metal salt of the metal salt solution comprises a metal chloride, a metal sulfate, a metal phosphate, or a combination thereof.

A fifty ninth embodiment can include the method of the fifty eighth embodiment, wherein the metal salt comprises magnesium chloride ($MgCl_2$), zinc chloride ($ZnCl_2$), magnesium sulfate ($MgSO_4$), zinc sulfate ($ZnSO_4$; $ZnSO_4$ ($H_2O_x$)), or a combination thereof.

A sixtieth embodiment can include the method of any one of the thirty seventh to fifty ninth embodiments, wherein the cementitious composition further comprises (e.g., wherein the salt solution further comprises) a viscosifier, a set retarder, a biocide, or a combination thereof.

A sixty first embodiment can include the method of any one of the thirty seventh to sixtieth embodiments, wherein the metal oxide and the metal salt comprise a same metal (e.g., magnesium (Mg), zinc (Zn), or a combination thereof).

A sixty second embodiment can include the method of the sixtieth or sixty first embodiment, wherein the salt solution comprises the viscosifier.

A sixty third embodiment can include the method of the sixty second embodiment, wherein the salt solution comprises from greater than 0 to about 0.2, from about 0.01 to about 0.15 or from about 0.05 to about 0.1 weight percent of the viscosifier, based on a total weight of the salt solution.

A sixty fourth embodiment can include the method of the sixty second or sixty third embodiment, wherein the viscosifier comprises biopolymer gum, guar gum, xanthan gum, welan gum, diutan, cellulose, hydroxyethyl cellulose (HEC), modified cellulose, diatomaceous earth, starch, modified and/or crosslinked starch, viscoelastic surfactants (VES), derivatives thereof, or a combination thereof.

A sixty fifth embodiment can include the method of any one of the sixty second to sixty fourth embodiments, wherein the salt solution comprises the set retarder.

A sixty sixth embodiment can include the method of the sixty fifth embodiment, wherein the salt solution comprises from about greater than 0 to about 2, from about 1 to about 2, or from about 0.5 to about 0.9 weight percent of the set retarder, based on a total weight of the salt solution.

A sixty seventh embodiment can include the method of the sixty fifth or sixty sixth embodiment, wherein the set retarder comprises sodium hexametaphosphate (e.g., technical grade granular), potassium magnesium phosphate hexahydrate, potassium magnesium hexametaphosphate or a combination thereof.

A sixty eighth embodiment can include the method of any one of the sixtieth to sixty seventh embodiments, wherein the salt solution comprises the biocide.

A sixty ninth embodiment can include the method of the sixty eighth embodiment, wherein the salt solution comprises from about greater than 0 to about 0.1, from about 0.01 to about 0.09, or from about 0.05 to about 0.075 weight percent of the biocide, based on a total weight of the salt solution.

A seventieth embodiment can include the method of any one of the thirty seventh to sixty ninth embodiments, wherein the cementitious composition has: a viscometer reading at 3 RPM, as determined in accordance with API RP 10B-2 $2^{nd}$ Edition 2013, of from about 1 to about 50, from about 5 to about 10, or from about 10 to about 25 degrees of dial deflection using a viscometer having an R1 B1 F1 configuration; a viscometer reading at 6 RPM, as determined in accordance with API RP 10B-2 $2^{nd}$ Edition 2013, of from about 2 to about 75, from about 5 to about 10, or from about 10 to about 30 degrees of dial deflection using a viscometer having an R1 B1 F1 configuration; a viscometer reading at 100 RPM, as determined in accordance with API RP 10B-2 $2^{nd}$ Edition 2013, of from about 10 to about 300, from about 20 to about 200, or from about 50 to about 65 degrees of dial deflection using a viscometer having an R1 B1 F1 configuration; a viscometer reading at 300 RPM, as determined in accordance with API RP 10B-2 $2^{nd}$ Edition 2013, of from about 20 to about 300, from about 50 to about 250, or from about 125 to about 175 degrees of dial deflection using a viscometer having an R1 B1 F1 configuration; or a combination thereof.

In a seventy first embodiment, a method of treating a wellbore comprises: placing the cementitious composition of the twenty first embodiment downhole and allowing it to set.

A seventy second embodiment can include the method of the seventy first embodiment, wherein the cementitious composition is placed downhole during a wellbore treatment operation comprising an intervention selected from lost circulation treatment, casing leak treatment, squeeze cementing, fluid inflow/outflow prevention, or a combination thereof.

A seventy third embodiment can include the method of the seventy first or seventy second embodiment, wherein the cementitious composition is used to treat lost circulation, isolate a gravel pack, support a conduit, plug a void or crack in the conduit, plug an opening between a cement sheath and a conduit, as a fluid in front of a cement slurry, to seal an annulus, as a spot fluid, or a combination thereof.

In a seventy fourth embodiment, a method comprises: (a) contacting, at a location proximate a wellsite, the liquid suspension of any one of the first to twentieth embodiments, a salt solution, and optionally one or more additives to form a cementitious composition; and (b) providing the cementitious composition in a wellbore penetrating a subterranean formation; and (c) allowing the cementitious composition to set. A seventy fifth embodiment can include the method of the seventy fourth embodiment further comprising forming the liquid suspension at a location other than the wellsite (e.g., a remote location).

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of treating a wellbore, the method comprising:
    prior to placing the a cementitious composition downhole:
        combining a metal oxide; and a glycol, a glycol ether, or a combination thereof, to provide a liquid suspension, wherein the liquid suspension comprises from about 20 to 70 weight percent (wt %) of the metal oxide and from about 30 to 80 wt % of the glycol, the glycol ether, or the combination thereof; and
        contacting the liquid suspension with a salt solution to form the cementitious composition, wherein the salt solution comprises from about 40 to 80 wt % of a metal salt and from about 20 to 60 wt % of water;
    placing the cementitious composition downhole; and
    allowing the cementitious composition to set.

2. The method of claim 1, wherein the cementitious composition is placed downhole during a wellbore treatment operation comprising an intervention selected from lost circulation treatment, casing leak treatment, squeeze cementing, fluid inflow/outflow prevention, or a combination thereof.

3. The method of claim 2, wherein the liquid suspension comprises the glycol; the liquid suspension further comprises a silica suspension aid and a non-ionic surfactant; the metal oxide comprises magnesium oxide; the metal salt comprises a metal chloride; and the method of treating the wellbore is squeeze cementing.

4. The method of claim 1, wherein the metal oxide remains suspended in the liquid suspension for at least about 60 days under room temperature and pressure.

5. The method of claim 1, wherein the metal oxide comprises magnesium oxide (MgO), zinc oxide (ZnO), or a combination thereof.

6. The method of claim 1, wherein the glycol comprises an alkylene glycol, monoethylene glycol, propylene glycol, butylene glycol, polyalkylene glycol, polyethylene glycol, polypropylene glycol, polybutylene glycol, or a combination thereof; and wherein the glycol ether comprises ethylene glycol monomethyl ether, ethylene glycol monoethyl ether, propylene glycol monomethyl ether, propylene glycol monoethyl ether, butylene glycol monomethyl ether, butylene glycol monoethyl ether, or a combination thereof.

7. The method of claim 1, wherein the cementitious composition further comprises a surfactant.

8. The method of claim 1, wherein the cementitious composition further comprises a suspension aid.

9. The method of claim 1, wherein the metal salt comprises a metal chloride, a metal sulfate, a metal phosphate, or a combination thereof.

10. The method of claim 1, wherein the cementitious composition further comprises a viscosifier, a set retarder, and a biocide.

11. The method of claim 1, wherein the liquid suspension further comprises a surfactant.

12. The method of claim 1, wherein the liquid suspension further comprises a suspension aid.

13. The method of claim 1, wherein the cementitious composition further comprises a viscosifier, a set retarder, a biocide, or a combination thereof.

14. The method of claim 13, wherein the salt solution comprises the viscosifier.

15. The method of claim 13, wherein the salt solution comprises the set retarder.

16. The method of claim 13, wherein the salt solution comprises the biocide.

17. The method of claim 1, comprising combining the metal oxide and the glycol to provide the liquid suspension.

18. The method of claim 1, wherein the cementitious composition comprises the liquid suspension and the salt solution in a weight ratio of from about 4:1 to 1:4.

* * * * *